(12) United States Patent
Zimmer et al.

(10) Patent No.: US 7,893,975 B2
(45) Date of Patent: Feb. 22, 2011

(54) SYSTEM AND METHOD FOR PROCESSING IMAGES USING PREDETERMINED TONE REPRODUCTION CURVES

(75) Inventors: Mark Zimmer, Aptos, CA (US); David Hayward, San Francisco, CA (US); Gabriel G. Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 555 days.

(21) Appl. No.: 11/756,918

(22) Filed: Jun. 1, 2007

(65) Prior Publication Data

US 2008/0088858 A1 Apr. 17, 2008

Related U.S. Application Data

(60) Provisional application No. 60/829,519, filed on Oct. 13, 2006.

(51) Int. Cl.
*H04N 5/202* (2006.01)
*H04N 17/02* (2006.01)

(52) U.S. Cl. .......................... 348/254; 348/188

(58) Field of Classification Search ............. 348/188, 348/254, 674; 382/274; 358/519
See application file for complete search history.

(56) References Cited

U.S. PATENT DOCUMENTS

| | | | |
|---|---|---|---|
| 6,285,398 B1 | 9/2001 | Shinsky et al. |
| 6,373,507 B1 | 4/2002 | Camara et al. |
| 6,453,066 B1 | 9/2002 | Shiraiwa |
| 6,664,973 B1 | 12/2003 | Iwamoto et al. |
| 6,724,423 B1 | 4/2004 | Sudo |
| 6,735,334 B2 | 5/2004 | Roberts |
| 6,758,574 B1 | 7/2004 | Roberts |
| 6,882,361 B1 | 4/2005 | Gaylord |
| 7,006,252 B2 | 2/2006 | Gallagher et al. |
| 2002/0036696 A1 | 3/2002 | Takemoto |
| 2002/0140825 A1 | 10/2002 | Terashita |
| 2002/0168103 A1 | 11/2002 | Shiraiwa |

(Continued)

FOREIGN PATENT DOCUMENTS

EP 1669923 6/2006

(Continued)

OTHER PUBLICATIONS

PCT International Search Report dated Feb. 19, 2008.

(Continued)

*Primary Examiner*—Jason Whipkey
(74) *Attorney, Agent, or Firm*—Wong, Cabello, Lutsch, Rutherford & Brucculeri LLP

(57) ABSTRACT

An automated RAW image processing method and system are disclosed. A RAW image and metadata related to the RAW image are obtained from a digital camera or other source. The RAW image and the related metadata are automatically processed using an Operating System service of a processing device to produce a resulting image in an absolute color space. When automatically processing, a predetermined tone reproduction curve is applied to the interpolate RAW image to produce the resulting image. The predetermined tone reproduction curve is derived from a plurality of reference images and is selected based on the metadata associated with the RAW image. The resulting image is then made available to an application program executing on the processing device through an application program interface with the Operating System service.

36 Claims, 15 Drawing Sheets

U.S. PATENT DOCUMENTS

| | | |
|---|---|---|
| 2003/0020808 A1 | 1/2003 | Luke et al. |
| 2003/0048264 A1 | 3/2003 | Cottone et al. |
| 2003/0053683 A1 | 3/2003 | Newman |
| 2003/0095178 A1* | 5/2003 | Shibayama ............... 382/274 |
| 2003/0123111 A1* | 7/2003 | Minakuti .................. 358/527 |
| 2003/0179284 A1 | 9/2003 | Aoyama |
| 2003/0184652 A1* | 10/2003 | Tanaka et al. ............ 348/207.1 |
| 2003/0184812 A1 | 10/2003 | Minakuti et al. |
| 2004/0033052 A1 | 2/2004 | Lim et al. |
| 2004/0036899 A1 | 2/2004 | Takano et al. |
| 2004/0042681 A1* | 3/2004 | Takano et al. ............. 382/274 |
| 2004/0212687 A1 | 10/2004 | Patwari |
| 2004/0212692 A1 | 10/2004 | Nakami et al. |
| 2004/0257455 A1* | 12/2004 | Aoyama ................. 348/222.1 |
| 2005/0018226 A1 | 1/2005 | Chiba |
| 2005/0111715 A1 | 5/2005 | Yoo et al. |
| 2005/0169519 A1 | 8/2005 | Minakuti |
| 2005/0196040 A1 | 9/2005 | Ohara |
| 2005/0207629 A1* | 9/2005 | Toyoda ..................... 382/128 |
| 2006/0030769 A1 | 2/2006 | Ramamurthy et al. |
| 2006/0125922 A1 | 6/2006 | Albert et al. |
| 2006/0164525 A1* | 7/2006 | Hosyuyama .............. 348/239 |
| 2006/0268357 A1 | 11/2006 | Vook et al. |
| 2007/0189603 A1 | 8/2007 | Kasperkiewicz et al. |

FOREIGN PATENT DOCUMENTS

| | | | |
|---|---|---|---|
| JP | 2004282570 | | 7/2004 |
| JP | 2005159645 A | * | 6/2005 |

OTHER PUBLICATIONS

PCT Written Opinion of the International Searching Authority dated Feb. 19, 2008.

International Preliminary Report on Patentability, PCT/US2007/079670, dated Apr. 15, 2009.

International Preliminary Report for PCT/US2007/079670, dated Apr. 15, 2009, 12 pgs.

Office Action from U.S. Appl. No. 11/756,918, dated Aug. 12, 2009, 22 pgs.

Reply to Non-Final Office Action from U.S. Appl. No. 11/756,918, filed Nov. 12, 2009, 15 pgs.

Notification of First Office Action in counterpart Chinese Appl. No. 200780038185.3, dated Aug. 25, 2010.

Jack Holm, "Camera raw—the basics," dated Feb. 14, 2006, 11 pgs.

Office Action mailed Aug. 14, 2009 in U.S. Appl. No. 11/756,906.

Reply to Office Action filed Nov. 14, 2009, U.S. Appl. No. 11/756,906.

Office Action mailed Dec. 1, 2009 in U.S. Appl. No. 11/549,627.

Reply to Office Action filed Feb. 26, 2010 in U.S. Appl. No. 11/549,627.

* cited by examiner

SYSTEM AND METHOD FOR PROCESSING IMAGES USING PREDETERMINED TONE REPRODUCTION CURVES

CROSS-REFERENCE TO RELATED APPLICATIONS

This is a non-provisional of U.S. Provisional Application Ser. No. 60/829,519, filed 13 Oct. 2006 and entitled "System and Method for Raw Image Processing," which is incorporated herein by reference in its entirety and to which priority is claimed.

FIELD OF THE DISCLOSURE

The subject matter of the present disclosure generally relates to processing RAW images into an absolute color space, and more particularly to, systems and methods for deriving a tone reproduction curve for image conversion and applying the tone reproduction curve during pre-processing of a RAW image.

BACKGROUND OF THE DISCLOSURE

The digital image sensor, such as a charged coupled device (CCD), of a digital camera has a plurality of photo-sites arranged in a colored filtered array or pattern, such as a RGB Bayer pattern described in U.S. Pat. No. 3,971,065. In the RGB Bayer pattern, each photo-site is filtered so that it is receptive to either red, green, or blue or some variation thereof. The original bit-for-bit digital image file captured by the digital imaging sensor is referred to as a RAW file or RAW image. Depending on a number of variables, the RAW image may typically require 8 to 18 MB of memory space. The type of colored filter array and digital imaging sensor varies typically based on the manufacture of the digital camera. For example, some color filtered arrays use a pattern of yellow, cyan, green, and magenta.

Typically, the digital camera has an image pipeline that performs a demosaicing or de-Bayering process on the RAW image and transforms the image with a compressing algorithm to output a JPEG or other type of compressed file suitable for display and viewing. However, the RAW image captured by the digital camera can be uploaded to a computer, and computer software, such as Apple's Aperture 1.0, operating on the computer can allow a user to perform various manual operations on RAW image.

The color information of processed digital images can be characterized by a number of color models. One color model is the RGB color space, which uses combinations of red (R), green (G), and blue (B) to produce a plurality of colors. Some RGB color spaces used for digital cameras include Standard RGB (sRGB) and Adobe RGB. Another color model is the CIE XYZ color space created by the International Commission on Illumination (CIE) in 1931. Mathematical techniques can be used to transform color information from one color space to another.

Digital cameras have white balance settings, such as auto, incandescent, fluorescent, cloudy, sunny, or sensitivity (e.g., ISO 100, ISO 2000, etc). The settings are used to match the white balance of the digital camera to the color temperature of light from the illuminant that is illuminating the subject in the image. Characteristics of various standard illuminants are defined in the art. For example, illuminant A is used to represent incandescent lighting and is defined by the profile of a black body radiator at 2856 K. Illuminant series D is used to represent natural daylight. A number is used in the name of the D series illuminant to indicate the correlated color temperature (CCT) of the source. For example, illuminant D50 has a CCT of 5000 K, and illuminant D65 has one of 6500 K. Illuminant series F is used to represents various types of fluorescent lighting. For example, illuminant F2 represents cool white fluorescent, while illuminant F11 represents a narrow-band fluorescent. When a digital image is obtained under one illuminant with a digital camera, it is possible to use a white point conversion technique to estimate the characteristics of the image under a different illuminant.

Various considerations must be addressed when processing a digital image obtained with a digital camera or other imaging device. One consideration involves preserving the spatial quality and the detail of the digital image, while another consideration involves sufficiently representing the color of the digital image. In many ways, these two considerations are interrelated.

BRIEF DESCRIPTION OF THE DRAWINGS

Preferred embodiments and other aspects of subject matter of the present disclosure will be best understood with reference to a detailed description of specific embodiments, which follows, when read in conjunction with the accompanying drawings, in which.

Figure 1:
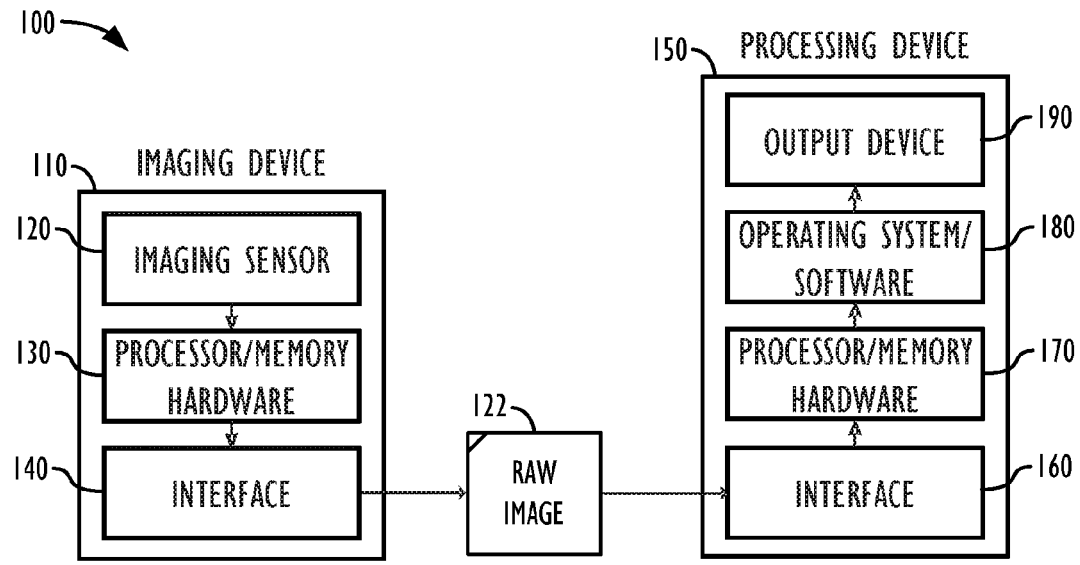
FIG. 1 illustrates one embodiment of a system for generating and processing RAW images.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

A. Raw Image Processing System

Referring to FIG. 1, one embodiment of a system 100 for generating and processing RAW images is schematically illustrated. The system 100 includes an imaging device 110 and a general-purpose processing device 150. In general, the imaging device 110 and the general-purpose processing device 150 may integrated together into one device, such as a digital still camera or the like, that has requisite processing and memory capabilities. Alternatively, the devices 110 and 150 may be separate components as shown in FIG. 1. For example, the imaging device 110 can be a digital still camera, a camera phone, or the like, and the processing device 150 can be a computer, laptop, or the like. In the description that follows, the imaging device 110 is referred to as a camera, and the processing device 150 is referred to as a computer for illustrative purposes.

The camera 110 includes an imaging sensor 120 for capturing digital images. The imaging sensor 120 can be any of the various types of imaging sensors known and used in the art, such as a charged coupled device. The camera 110 also has processor and memory hardware 130 and an interface 140 for communicating data to the computer 150. In turn, the computer 150 has an interface 160, processor and memory hardware 170, operating system and software 180, and an output device 190.

In use, the imaging sensor 120 of the camera 110 captures a RAW image 122. As discussed previously, the imaging sensor 120 has a color-filtered array that can be arranged in an RGB Bayer pattern. Therefore, the color value at each photosite in the RAW image 122 represents either a red intensity value, a green intensity value, or a blue intensity value, and each value is typically 10-bits in the range of 0 to 4095. Other camera manufactures may have other color filter arrays so that the RAW image 122 may have different information. For a Sony "828" digital camera, for example, the color values are in four-channel RGBE coordinates representing Red, Green, Blue, and Emerald. For descriptive purposes, the discussion that follows will refer to the RAW image 122 having RGB values.

After capturing the RAW image, the processor/memory hardware 130 can output the RAW image 122 via the interface 140, which can be a Universal Serial Bus (USB) interface. The computer 150 can then receives the RAW image 122 with its interface 160. Preferably, the computer 150 stores the RAW image 122 as a master file to maintain an original copy of the RAW image 122 while pre-processing described below is performed on a copy of the RAW image 122. In an alternative to importing the RAW image 122 from the camera 110, it can be imported from a network, a memory card, another computer, or an external storage media such as a flash memory, external hard disk drive, or CDROM.

Using techniques discussed in detail later, the processor/memory hardware 170 and operating system/software 180 pre-process the copy of the RAW image 122 and ultimately convert it into an absolute color space (e.g., sRGB, Adobe RGB, or the like, which is also referred to as a rendered color space) suitable for display and viewing. After pre-process the RAW image 122 and converting it the absolute color space, the processor/memory hardware 170 and operating system/software 180 make the resulting image available to various types of software and applications on the computer 150. For example, the resulting pre-processed image may be made available to imaging applications, such as Apple Computer's Preview, iPhoto, and Aperture software components, where the image can be processed, viewed, manipulated, etc.

As noted above, the operating system/software 180 is used to pre-process the RAW image 122. Accordingly, we now turn to a description of a software architecture for pre-processing the RAW image 122.

B. Software Stack of Raw Image Processing System

Figure 2:
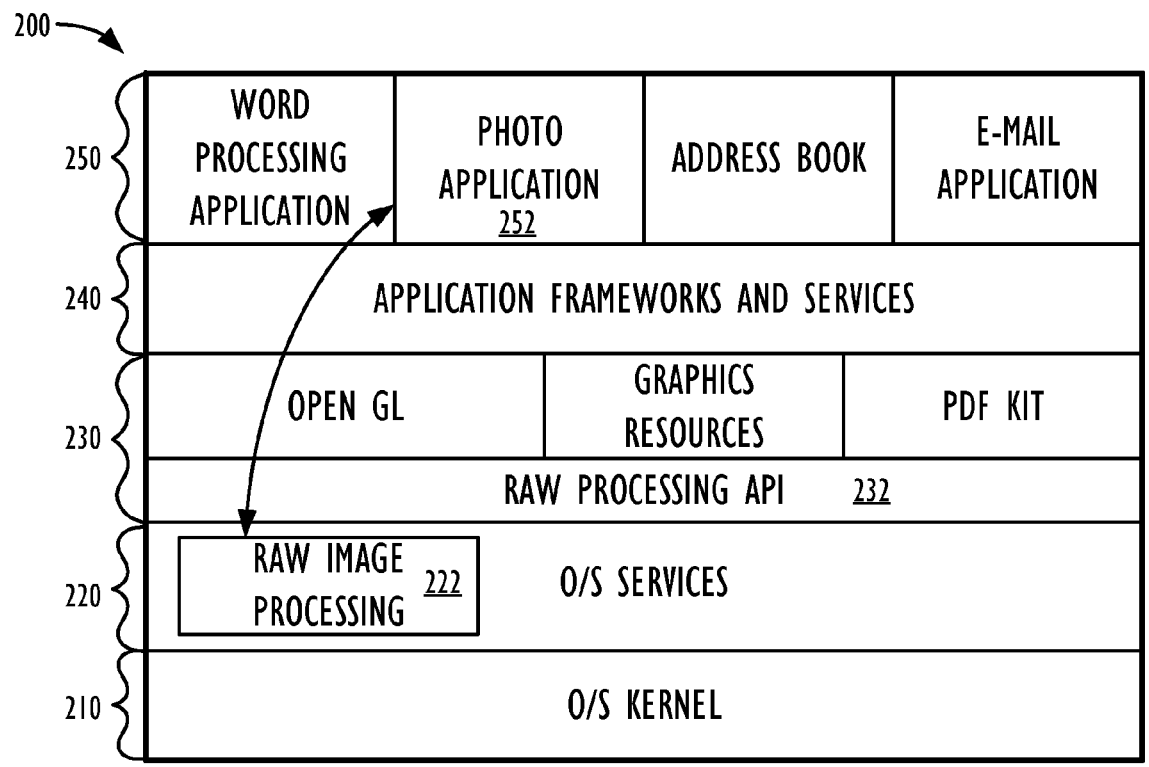
FIG. 2 illustrates one embodiment of a software stack for a general purpose processing device for implementing RAW processing according to certain teachings of the present disclosure.

FIG. 2 illustrates a layer diagram of one embodiment of a software stack 200 for a general-purpose processing device, such as the computer 150 of FIG. 1. Portions of the software stack 200 can even be part of the digital camera 110 of FIG. 1. The software stack 200 includes an Operating System (O/S) kernel layer 210, an O/S services layer 220, a resource layer 230, an application frameworks and services layer 240, and an application layer 250. These layers are illustrative and have certain features omitted. For example, lower level software and firmware below the O/S kernel layer 210 are not shown. In general, software elements shown in one layer use the resources from the layers positioned below and provide services to the layers positioned above. However, in practice, all components of a particular software element may not behave entirely in this manner.

The O/S kernel layer 210 provides core O/S functions in a highly protected environment. Above the O/S kernel layer 210, the O/S services layer 220 extends functional services to the layers above it. The O/S service layer 220 for the operating system of a computer offers a number of functional services, while an in-camera operating system for a digital camera may offer services that are more limited. In the present embodiment, the O/S services layer 220 has a RAW image processing service 222 for performing pre-processing on the RAW image according to the various teachings discussed below.

The resource layer 230 is above the O/S services layer and shows graphics resources, such as Open Graphics Library ("OpenGL"), Apple Computer's PDF kit, etc. OpenGL developed by Silicon Graphics, Inc. is a specification for various graphics functions. A RAW processing Application Programming Interface (API) 232 is positioned between the resource layer 230 and the RAW image processing service 222 in the O/S Service Layer 220. Layer 240 is an amalgamation of functions typically expressed as two layers: applications frameworks and application services. This layer 240 provides high-level and often functional support for application programs that reside in the highest layer shown here as application layer 250.

The RAW processing service 232 leverages the Central Processing Unit (CPU) of the general-purpose processing device to pre-process RAW images. The RAW processing service 232 can also use OpenGL to leverage the Graphics Processing Unit (GPU) associated with the general-purpose processing device. In turn, the RAW processing API 232 makes the pre-processed images of the service 232 available to the various application programs in the application layer 250. Thus, the RAW image can be pre-processed using the RAW image processing service 222 in the O/S services layer 220 and hardware (e.g., CPU/GPU) of the general-purpose processing device. In this way, RAW processing can be focused in the OS services layer 222 to produce higher quality images with increased editability compared to regular JPEG files provided by a camera because RAW images contain more information.

In addition, the pre-processed images can be made available to various applications that in the application layer 250 that may or may not be capable of processing RAW images. The application programs in layer 250 that can use the pre-processed images can include word processing applications, photo applications, address book applications, e-mail applications, or any other applications that may use images. In addition, the RAW processing techniques disclosed herein may be applicable to RAW video as well so that applications that use video may also benefit from the techniques disclosed.

C. Overview of Raw Image Processing Pipeline

Figure 3:
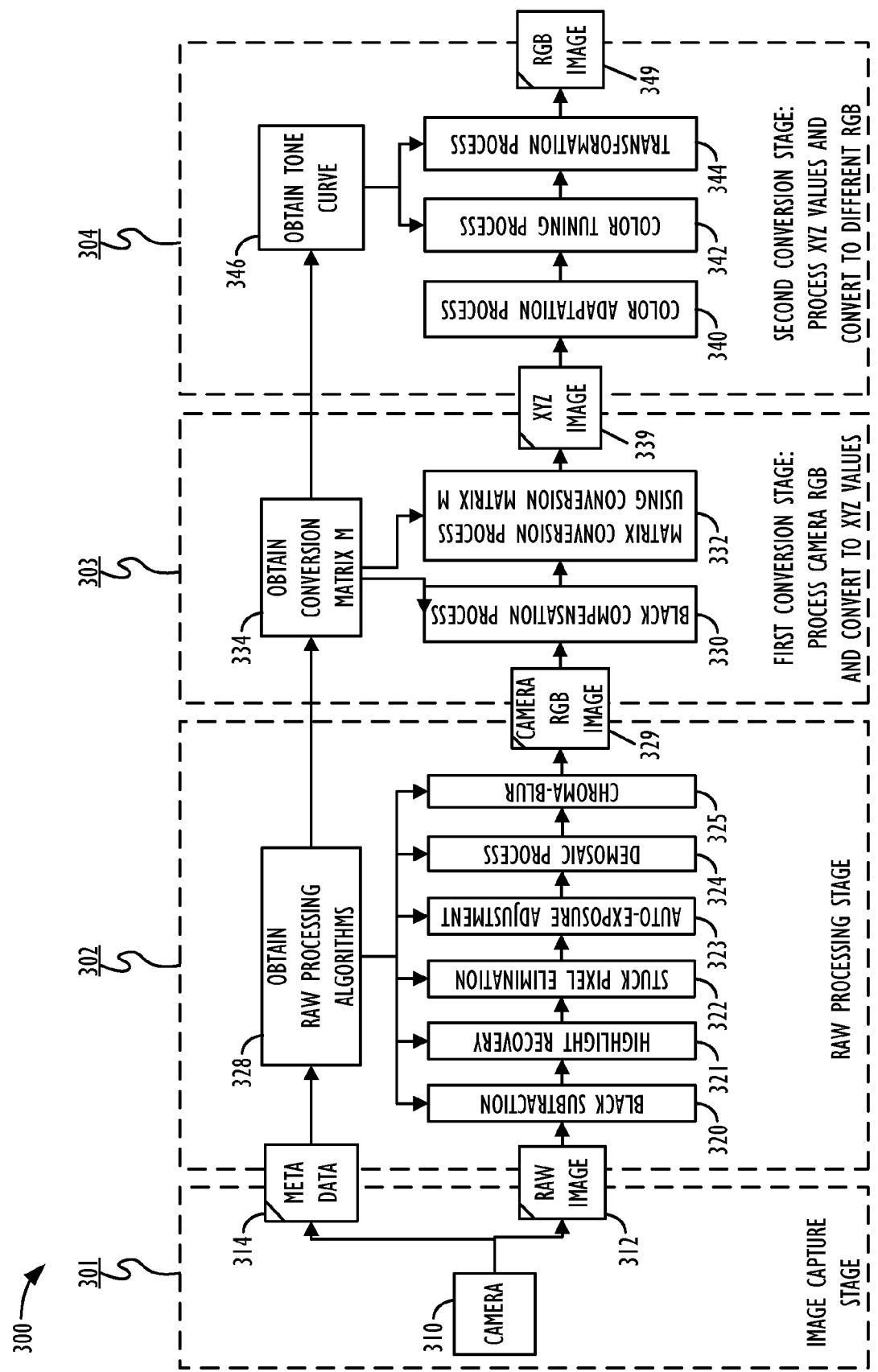
FIG. 3 illustrates one embodiment of an automated RAW image processing pipeline according to certain teachings of the present disclosure.

As alluded to in the above embodiment, the pre-processing of RAW images can be performed in the RAW image processing service 222 that operates in the O/S service layer 220 of the general purpose computer. A pipeline is one way of characterizing image processing. FIG. 3 illustrates one embodiment of a RAW image processing pipeline 300 according to certain teachings of the present disclosure. The pipeline 300 is illustrated in a plurality of stages 301, 302, 303, and 304 for pre-processing a RAW image 312 from a digital camera 310 or other source and for outputting a resulting image 349 for use by various applications (not shown). In an initial image capture stage 301, the camera or other imaging device 310 captures an image and stores it in the RAW format as a RAW image or file 312 as discussed previously. At this point, the RAW image 312 may be communicated from the camera 310 to a general-purpose processing device or computer (not shown) or may remain at the camera 310 for RAW processing, depending on the processing capabilities of the camera 310.

To enable later processing, the white balance and other metadata 314 for the RAW image 312 and the particular camera 310 used to obtain the RAW image 312 are identified because later processing stages will depend on attributes of the image 312 and the camera 310. The metadata 314 can be in an Exchangeable Image File (EXIF) format and can include information about how the RAW image 312 image was captured, including shutter speed, aperture, white balance, exposure compensation, metering setting, ISO setting, date, and time, for example.

In a RAW processing stage 302, RAW processing is performed on the RAW image 312 using one or more various processes, including a black subtraction process 320, a highlight recovery process 321, a stuck pixel elimination process 322, an auto-exposure adjustment process 323, a demosaic (de-Bayer) process 324, and a chroma-blur process 325. One purpose of the RAW processing stage 302 is to preserve spatial quality and detail of the captured scene in the RAW image 312.

To implement these processes 320-325, the metadata 314 is used to obtain various raw processing algorithms associated with the processes (Block 328). Although shown in a particular order, one or more of these processes 320-325 may be rearranged depending on specific requirements, such as any particulars associated with the camera. In addition, one or more of these processes 320-325 may or may not be used for various reasons, and other processes commonly used in image processing can be used. Furthermore, some of these various processes 320-325 may actually operate in conjunction with one another in ways not necessarily expressed herein.

At the end of the RAW processing stage 302, the demosaic process 326 produces a camera RGB image 329 from the initial RAW image 312. Here, camera RGB indicates that the image 329 has an unrendered RGB color space, such as ISO RGB defined in ISO 17321. The camera RGB image 329 embodies an estimate of the original colorimetry of the scene captured in the initial RAW image 312, and the camera RGB image 329 maintains the dynamic range and the gamut of the original. The camera RGB image 329 must go through additional processing for it to be displayed, viewed or printed with an output device.

In general, the demosaic process 326 transforms the device-specific RAW data of the initial image 312 to unrendered RGB data in the resulting image 329 that is independent of the device (e.g., camera) used to capture the initial image 312. The actual implementation of the demosaic process 326 can depend on specifics of the image 312 and/or the imaging sensor used to capture that image 312. For example, actual colors for pixels in the camera RGB image 329 are interpolated from the multiple photo-sites in the RAW image 312 because each photo-site has only one color value for R, G, or B. This image reconstruction process is called demosaicing (or De-Bayering in the case of a Bayer Matrix filter). In general, the demosaic process 326 takes the plurality of color values represented in either R, G or B at the photo-sites in the RAW image 312 and outputs pixels having R, G and B values in the camera RGB image 329. Typically, components of a given pixel are computed from intensities of its neighbors. Therefore, the demosaic process 326 is typically device specific because it depends on the arrangement of filters in a camera's color filter array.

Two conversion stages 303 and 304 follow the RAW processing stage 302. One purpose of these conversion stages 303 and 304 is to sufficiently represent the color of the original scene that was captured. In many ways, the consideration in these stages 303 and 304 of sufficiently representing the color is interrelated with maintaining details of the RAW processing stage 302. The final result of these conversion stages 303 and 304 is a resulting image 349 in a rendered color space, such as Standard RGB or Adobe RGB. The resulting RGB image 304 can then be made available to word processing applications, photo applications, address book applications, e-mail applications, or any other applications that may use images, as discussed previously with reference to FIG. 2.

In a first conversion stage 303, the camera RGB image 329 is automatically processed and converted into XYZ tristimulus values in the XYZ color space to produce an XYZ image 339. The XYZ color space is used for its various advantages and so that the image data will be compatible with the processes occurring in this stage 303. For example, converting to the XYZ color space allows color values to be correlated with measurable color temperatures to sufficiently represent original colors of the scene captured by the camera 310.

In this stage 303, a black compensation process 330 adjusts the black level in the camera RGB image 329. Concurrently, a matrix conversion process 332 converts the camera RGB image 329 into the XYZ image 339 having XYZ tristimulus values. To do the processing during this stage 303, certain metadata 314 (including the white balance) is used to obtain a conversion matrix (M) (Block 334) and perform other necessary calculations detailed below.

In general, the black compensation process 330 subtracts a black level from the camera RGB image 329 to provide more efficient coding and processing in later stages. In addition, the black level to be subtracted depends on the image content and the camera model, and the black level can be adjusted to reduce noise or produce better color rendition. The black compensation process 330 is configured for the particular camera used to capture the RAW image 312. The process 330 receives the pixels having R, G and B values as input and outputs black compensated R, G and B values. The black compensation process 330 optimizes the black offset on each RGB channel such that the conversion from camera RGB tristimulus values to the XYZ tristimulus values will have minimal error. The black compensation process 330 is derived by a process discussed in more detail with reference to FIG. 13.

The matrix conversion process 332 incorporates the black compensation described above and takes the R, G and B values of the camera RGB image 329 as input and outputs XYZ tristimulus values. In general, the process 332 uses two or more camera characterization matrices $M_1$ and $M_2$ that are specific to a camera, model, etc. and that are associated with predefined illuminants. Each of the camera characterization matrices $M_1$ and $M_2$ are derived by comparing measured color values of a color chart with the sensed data of a given camera when shooting the color chart. One embodiment for deriving characterization matrices is discussed below with reference to FIG. 12. In one advantage of this stage 303, the pre-calculation and derivation of the camera characterization matrices involves an automatic process that is independent of user subjectivity and of other implementations of RAW conversion. Thus, the automated processing in the pipeline 300 can provide a quality processed image for use by various applications of a computer.

Using camera characterization matrices specific to the camera used to obtain the RAW image 312, the process 332 derives a conversion matrix (M) that is then used to perform the black compensation and the conversion to XYZ tristimulus values on the camera RGB image 329. The conversion matrix M is used in conjunction with the white balance in the metadata 314 to estimate the optimum matrix conversion from camera RGB to XYZ tristimulus values. The conversion matrix M is derived by a process discussed in more detail with reference to FIG. 14.

Finally, in a second conversion stage 304, the converted data of XYZ tristimulus values are processed and converted to values in an absolute color space, such as Standard RGB (sRGB) or Adobe RGB. First, a chromatic adaptation process 340 reproduces the appearance of colors in the image 339 by applying a chromatic adaptation transform. The chromatic adaptation transform converts the XYZ tristimulus values of input colors captured under an input illuminant to corresponding XYZ tristimulus values of output colors under a predicted output illuminant. Chromatic adaptation transforms are known in the art, and most of them are based on the von Kries model.

Next, a color tuning process 342 adjusts the tone curve of the XYZ tristimulus values of the image. Finally, a transformation process 344 that incorporates the color tuning process 342 transforms the XYZ tristimulus values to RGB tristimulus values of the absolute, rendered color space, such as sRGB or Adobe RGB, so that a resulting image 349 in a specific RGB color space results. The rendered color space (e.g., sRGB or Adobe RGB) is based on the colorimetry of real or virtual output characteristics. To do the processing during this second conversion stage 304, certain metadata 314 from the camera 310 is used to obtain a tone curve (Block 346) and perform other necessary calculations detailed below.

In general, the color tuning process 342 sets a gain and output tone reproduction curve to optimize rendering of the image to an output media. The process 342 automatically derives parameters for the conversion per camera type and manufacturer. Being automatic, the process 342 allows output to be derived based on a known target and without manual intervention by a user, thereby eliminating the subjectivity associated with manual color tuning by a user. One embodiment of a process for deriving a tone reproduction curve for the automatic color tuning process is discussed in detail below with reference to FIGS. 15A-15C.

The transformation process 344 incorporates the color tuning process 342 discussed above. In general, the transformation process 344 transforms the XYZ tristimulus values to RGB tristimulus values in the specified rendered color space, such as sRGB and Adobe RGB. The resulting RGB image 349 can then be accessed by applications or other software for further processing and manipulation.

D. Details of Raw Processing Stage in the Raw Image Processing Pipeline

Figure 4:
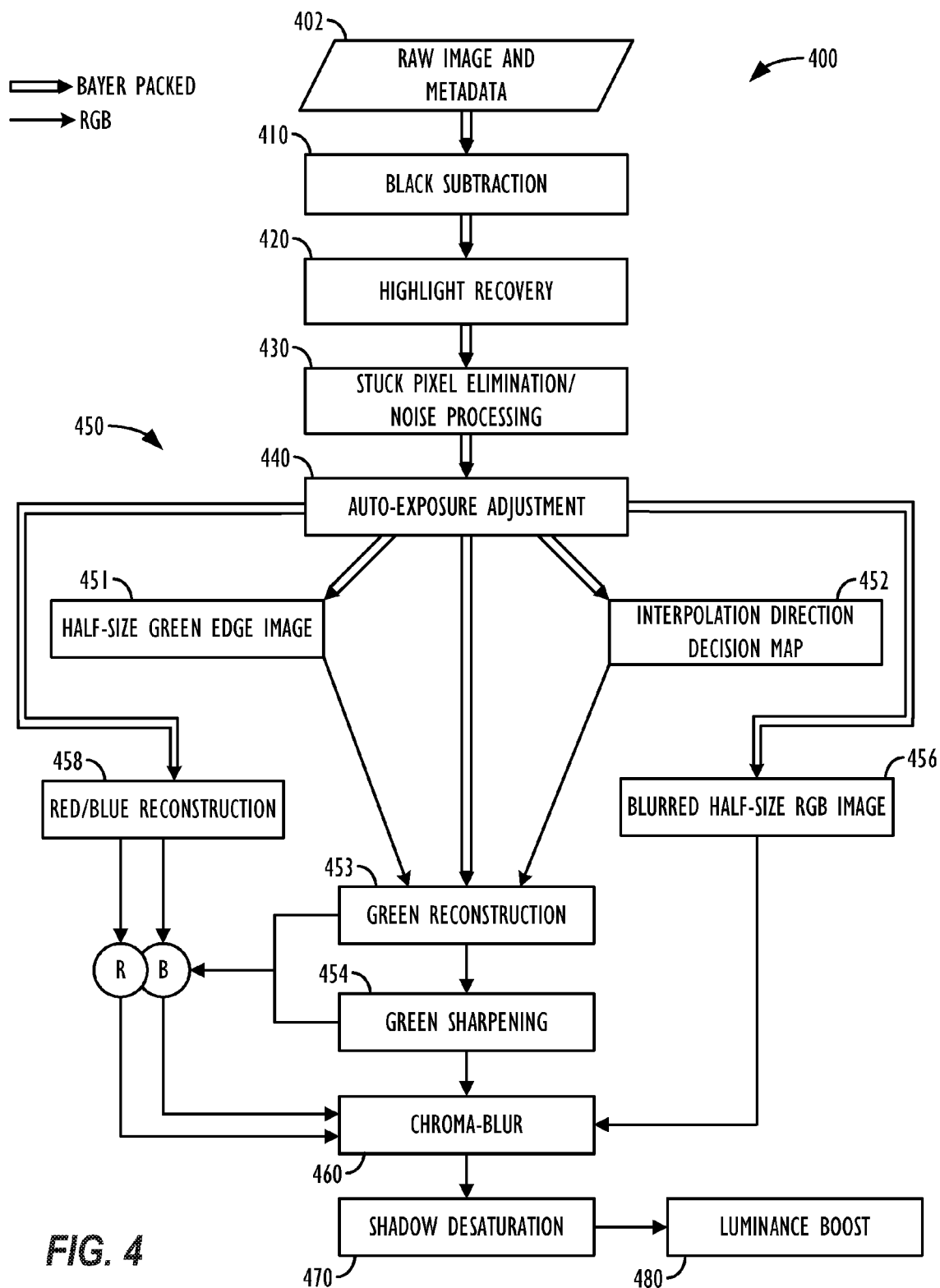
FIG. 4 illustrates one embodiment of an automated RAW processing stage of FIG. 3.

As noted previously, the RAW image processing pipeline 300 of FIG. 3 has RAW processing stage 302 that includes various processes. FIG. 4 illustrates details of one embodiment of a RAW processing stage 400. Although the stage 400 is illustrated as a series of steps, it will be appreciated that a given implementation may used a different ordering of steps, may eliminate certain steps, or may add additional steps not shown. The input for the RAW processing stage 400 is the RAW image 402 and the metadata. The RAW image 402 is Bayer packed (e.g., the photo-sites in the image 402 are arranged in a Bayer Pattern or the like and each have one R, G, or B value).

1. Black Subtraction

In a first step 410 of the RAW processing stage 400, black subtraction is performed on the input RAW image 402. In this step 410, the color samples (R, G, B) of the photo-sites are scaled and biased based on camera-specific factors. For most cameras, even an image taken with the lens cap on will result in an image with small non-zero color values for the photo-sites. The non-zero color values correspond to a black offset or bias value of the camera that can be caused by noise or other reasons. For the final image to be correct, the black offset value must be removed from the values of the color samples.

The RAW image 402 from the camera may or may not be black compensated when it is generated. For some cameras, the sensor data is automatically black compensated after it is generated. In this case, the metadata of the RAW image may have an offset value of 0.

In some situations, the camera may provide the offset value in the metadata of the image 402 below which there is no sensor data. In this case, the black offset value is subtracted from the color values of the RAW image 402 in this step 410. For example, the black offset value for the RAW image 402 from some cameras may be estimated from an average of values on the margin of the imaging sensor that are masked from incident light. For camera models that do not use a sensor mask at the margins, the black offset value can be a fixed value for the camera model. Either way, the black offset value can then be subtracting from each intensity value in the image 402. Generally, the R, G, and B photo-sites of the camera may have different offset values. G generally may have two offset values. Cameras may also provide a "row" dependent offset value.

As seen above, the metadata associated with the RAW image 402 is one source of the black offset value. An override file may be a secondary source of the black offset value. The override file may include black offset values that have been predetermined on a per-camera-model basis. This secondary black offset can be used to either augment or replace the value associated with the metadata, and the secondary black offset can also be different for each color channel (R, G, B).

After subtracting the black offset values, the resulting values are preferably clipped at zero to eliminate negative values in the RAW image 402. In addition, it may be necessary to scale the values into a common range because different cameras have ranges of raw sensed values. This can be accomplished by multiplying all the black subtracted values by a predetermined value and then dividing by a white value for the current camera. The white value can be predetermined and can be obtained from an override file or metadata.

2. Highlight Recovery

In a second step 420 of the RAW processing stage 400, the RAW image 402 undergoes highlight recovery to correct sensed values in the image 402 that have been clipped at a maximum level of the sensor's response. The imaging sensor used to obtain the RAW image 402 is capable of responding to light up to a maximum value (referred to herein as a max-out value). Thus, any received light above that max-out value is not detected by the sensor element. To recover highlights in the image 402 where light values have exceeded the max-out value of the sensor, the sensed values in the image 402 that are clipped at the max-out value are replaced by new estimated values using neighboring, unclipped values of different color channels (R, G, B).

In one embodiment, values for neighboring sensors near to a maxed-out sensor value are located. These neighboring sensors may have R, B, or G values that are about 85 to 90% of the max-out value and are used to determine what value should be used for the maxed-out sensor. This may work well for images where there are isolated sensor values that are maxed-out and may be used within the RAW image. In general, however, a given image may have clusters or regions where the sensor values have maxed-out so that averaging neighboring pixels is not practical.

Figure 5:
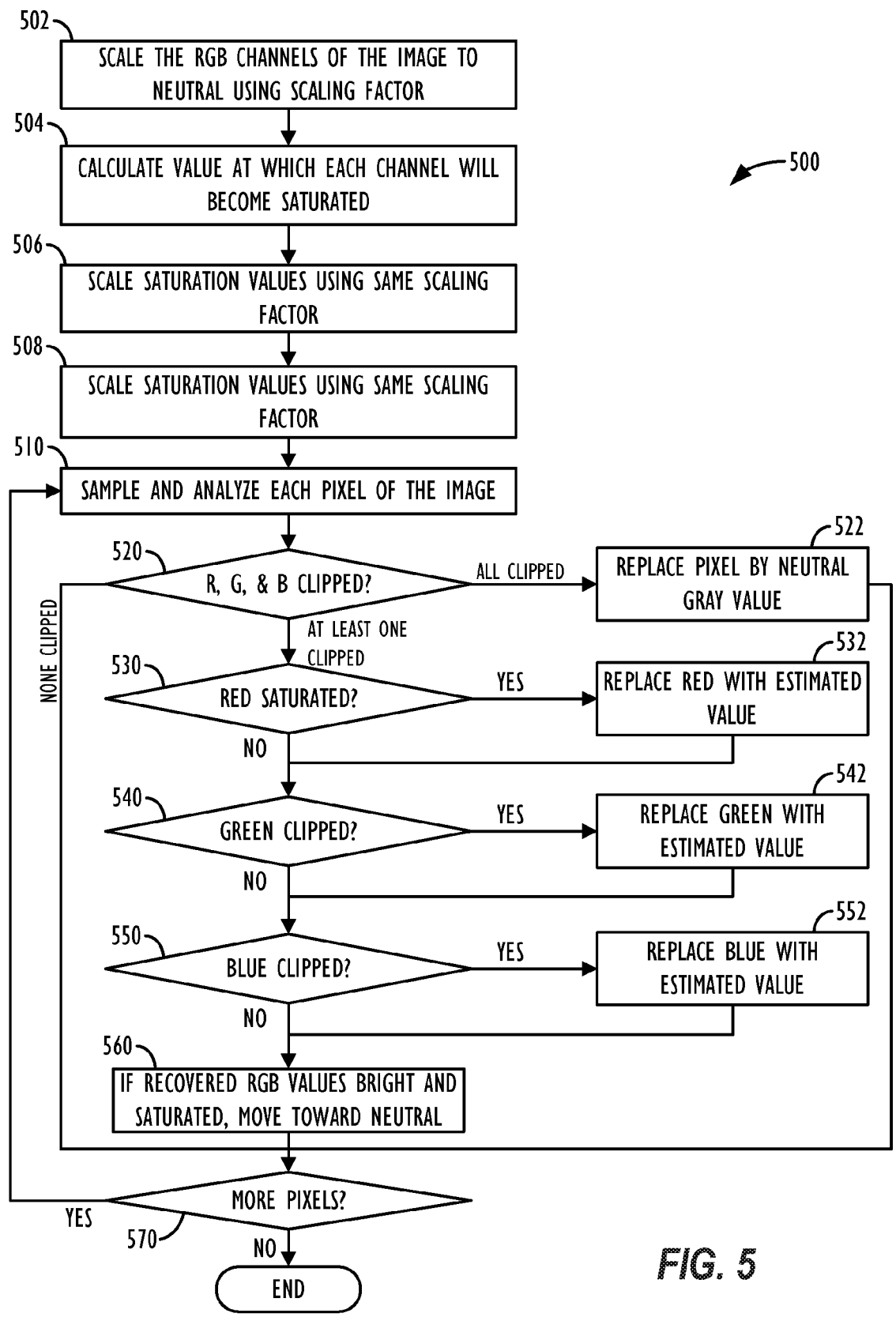
FIG. 5 illustrates one embodiment of a process for performing highlight recovery for the RAW processing stage of FIG. 4.

In another embodiment, FIG. 5 shows a highlight recovery process 500 that is applied to recover the luminance and hue of pixels where one or two of the channels are clipped by the limits of the sensors. This process 500 is implemented very early in the demosaicing (de-Bayering) process. First, the R, G, and B sensor channels are scaled so that they are neutral (Block 502). The scaling factor is determined using the white balance obtained from the metadata associated with the RAW image. Second, a value is calculated at which each channel will become saturated (Block 504). The calculation is performed using correlation information that correlates channel saturation values to over-exposed images that have been examined for the given camera make and model. Thus, the correlation information may be predetermined and stored for a plurality of camera makes and models for later access by the highlight recovery process 500. In this way, the camera information obtained from the metadata associated with the RAW image is used to access the corresponding correlation information for the camera make or model that obtained the RAW image.

The saturation values are then scaled by the same factor used in Block 502 (Block 506). For most cameras, the green channel has the smallest saturation value, and this behavior may be exploited by the highlight recovery process 500. Each pixel in the image is sampled and analyzed by the process 500 (Block 510). If all three channels R, G, and B of a given pixel are not clipped (Block 520), the pixel is left as-is. If all three channels of the given pixel are clipped (Block 520), the pixel is replaced by a neutral grey value (Block 522).

If at least one (but less than all) of the channels is clipped (Block 520), the process 500 looks at the saturation of the various channels. As detailed below, a channel of a given pixel having a saturated value is replaced by an estimated value. The replacement of the saturated value with the estimated value is graduated and depends on how close the original value is to saturation. The estimated value is calculated based on the original RGB values at the pixel.

If the red value in the given pixel is at-or-near saturation (Block 530), for example, then the original red value is replaced with an estimated red value calculated from the original R, G, and B values (Block 532). The estimated red value is $$\frac{(R_{Original} + B_{Clipped})}{2}.$$

The replacement is based on a weighted average calculated between the original value and the estimated value that depends on how close the red value is to saturation. For example, if the red value is at 85% of the sensor clip value, then 100% of the original red value is used. If the red value is at 90% of the sensor clip value, for example, then 50% of the original red value is used along with 50% of the estimated value for the replacement. If the red value is at 95% of the sensor clip value, for example, then 100% of the estimated value is used for the replacement.

If the green value in a given pixel is at-or-near saturation (Block 540), then it is gradually replaced with an estimated green value calculated from the original R, G, and B values (Block 542). The estimated value for the G channel is based on a weighted average of the original R, G, B values. The R, G, B weights that are used range from (0.5, 0, 0.5) to (0.375, 0.625, 0.0) depending on a calculation of how green the original pixel is. The replacement also uses the weighted average discussed above.

If the blue value in a given pixel is at-or-near saturation (Block 550), then it is gradually replaced with an estimated blue value calculated from the original R, G, and B values (Block 552). As with the R channel, the estimated value for the blue value is $$\frac{(R_{Original} + B_{Clipped})}{2}.$$

The replacement also uses the weighted average discussed above.

As a final step when one or more of the channels has been estimated, if the recovered RGB values are very bright and saturated, the color is moved toward neutral (Block 560). Magenta hues that are less likely to be seen in bright areas of the image are more aggressively moved towards neutral. Moving colors toward neutral may be affected by user preferences. After analyzing the given pixel, a determination is made if additional pixels in the image need to be analyzed (Block 570), and the process 500 returns to Block 510 to sample and analyze additional pixels of the image.

3. Stuck Pixel Elimination/Noise Processing

Returning to FIG. 4, the RAW processing stage 400 includes a third step 430 where those photo-sites in the RAW image 402 that have aberrant values are changed using stuck pixel elimination and/or noise processing techniques. In a given RAW image, various photo-sites may have atypical values because the sensor did not have a proper response (e.g., the sensor is stuck or has accumulated charge at the photo-site).

For these stuck photo-sites, a neighborhood of 3×3 like photo-sites is evaluated, and a range of the 8 surrounding values taken from that neighborhood is determined, resulting in a minimum and a maximum value. For example, if we are at a green pixel, only green photo-sites are examined. The size of the range is determined, equal to the maximum minus the minimum of the range. The value at the stuck photo-site is compared against the neighboring like photo-sites range. If the value of the selected photo-site is greater than the maximum by a predetermined factor times the size of the range, or if the value of the selected photo-site is less than the minimum by a predetermined factor times the size of the range, then the value for that photo-site is set to the average of the 3×3 neighborhood. The predetermined factor can be configured based on the camera and other factors. Replacing the atypical values with the average of their neighbors will reduce the number of stuck pixel values apparent in the RAW image 402.

Noise in a given image produces channel samples with aberrant values. This noise can be amplified when an RGB image is constructed from the Bayer-encoded RAW image. Typically, the rendered noise is undesirably colorful. This noise can be correlated to the ISO setting (i.e., the gain on the sensor readout) and the amount of exposure time used when the RAW image 402 is captured. Therefore, the noise processing in sub-step 430 preferably uses a correlation between ISO setting, exposure time, and amount of noise to reduce or control the colorfulness of noise for the RAW image 402 being processed.

Figure 6:
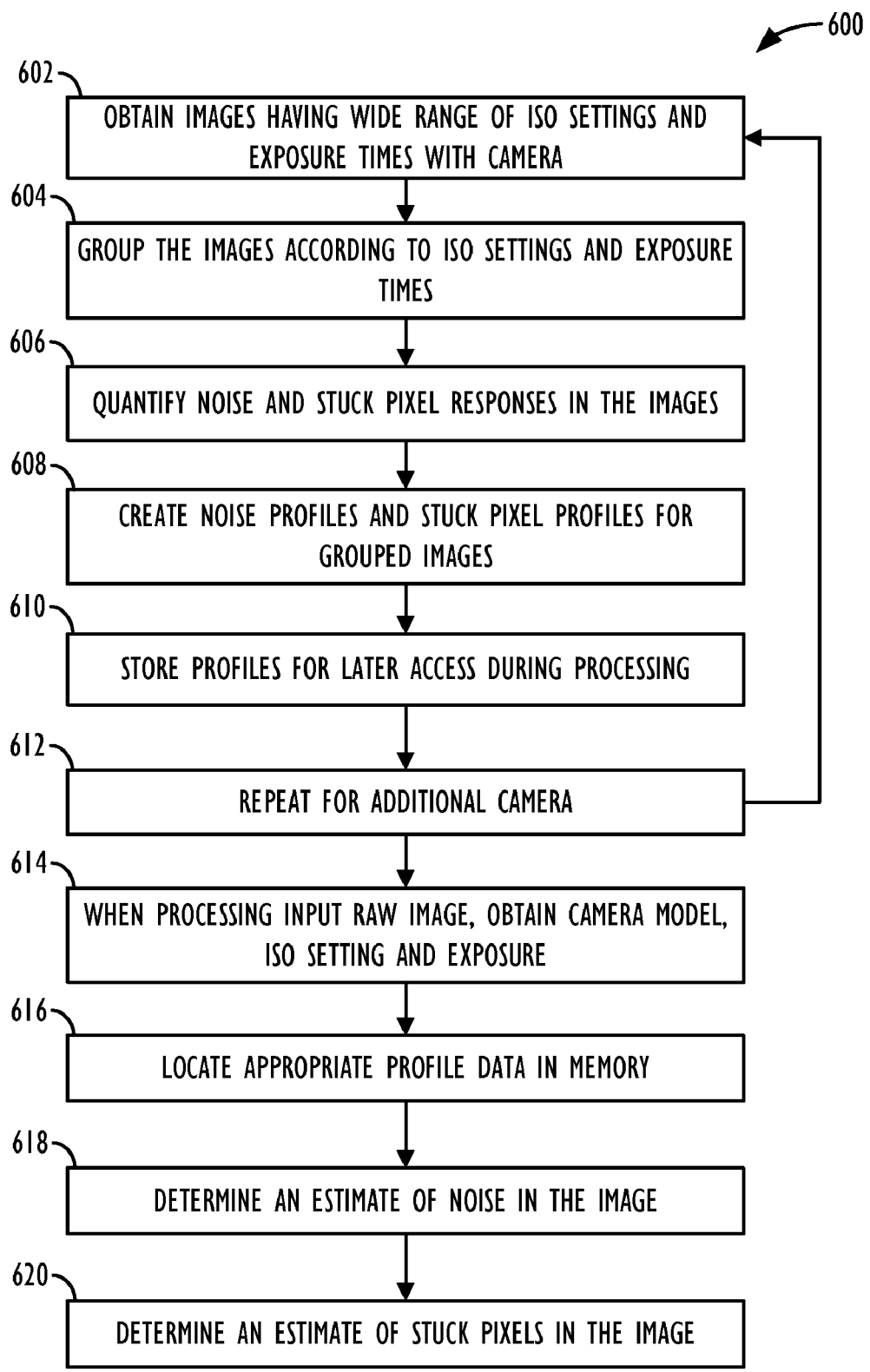
FIG. 6 illustrates one embodiment of a process of deriving profiles for a camera to reduce noise and stuck pixels in the RAW processing stage of FIG. 4.

FIG. 6 shows a process 600 for deriving noise and stuck pixel profile data for a digital camera. The profile data correlates the amount of noise the camera produces at given ISO settings and exposure times. This profile data is then used to handle RAW images being pre-processed in the RAW processing stage 400 of FIG. 4.

First, a digital camera is secured with the lens cap and eyepiece closed, and a plurality of images are taken under a wide range of ISO settings and exposure times for that particular camera (Block 602). The RAW images are then grouped into a number of organized sets (Block 604). For example, a first organized set can have images with a low range of exposure times and with a wide range of ISO settings. In addition, a second organized set can have images with a low range of ISO settings and with a wide range of exposure times, and a third organized set can have images with a high range of exposure times and with a wide range of ISO settings.

The RAW images are then processed to quantify the noise response (e.g., amount of noise) and to quantify the stuck pixel response in each RAW image (Block 606). Then, noise profiles and stuck pixel profiles are calculated for the grouped images (Block 608). For each of the organized sets, for example, a quadratic regression creates a noise profile of the camera's noise response relative to the ISO settings and exposure times for the given set. For each of the organized sets, for example, a quadratic regression model also creates a stuck pixel profile of the camera's stuck pixel response relative to the ISO settings and to exposure times. The resulting profiles for the camera are stored in the form of a small number of floating point values in a database for later use during pre-processing in the RAW processing stage 400 of FIG. 4 (Block 610). Then, the previous steps are repeated for one or more additional cameras so that profiles can be stored for those particular cameras (Block 612).

Ultimately, the stored profile data characterizing various cameras can be used to decide how much to adjust a given RAW image for noise. When a RAW image is being processed in the RAW processing stage 400 of FIG. 4, for example, the camera model, the ISO setting, and the exposure time associated with the RAW image is obtained from the associated metadata (Block 614). The appropriate profile data for the camera model is located in memory (Block 616). The given ISO setting and exposure time information is plugged into the formula for the noise profile for that particular camera model, and an estimated amount of noise for that image is determined from the calculation (Block 618). Then, the given ISO setting and exposure time information are plugged into the formula for the stuck pixel profile for that camera model, and a decision is made whether to enable or disable Stuck Pixel Elimination for that image (Block 620).

When processing the RAW image in the RAW processing stage 400 of FIG. 4, the estimated information for noise and stuck pixels determined in the previous steps can be used to adjust processing. For example, the information can determine whether or not and to what extent to perform noise reduction and stuck pixel elimination while reconstructing the RAW image. In addition, the information can determine whether or not and to what extent to perform ramping down sharpening during or after reconstructing the RAW image. Finally, the information can determine whether or not and to what extent to control colorfulness of noise during conversion of the RAW image to RGB at the end of reconstruction using chroma-blur, explicit de-saturation in deep shadow areas, or tonal reproduction curves for saturation control during contrast boost. These processes will be discussed in turn later in the present disclosure.

4. Auto-Exposure Adjustment

Returning to FIG. 4, the RAW processing stage 400 includes a fourth step 440 where the RAW image 402 undergoes an auto-exposure adjustment. The auto-exposure adjustment adjusts luminance of the RAW image 402 so that its exposure meets predetermined criteria. Preferably, the adjustment uses predetermined luminance variables that are already stored for the adjustment in the RAW processing stage 400. The predetermined luminance variables are based on survey information obtained from a plurality of people viewing various images with adjusted exposure. The survey uses reference images generated with various cameras at a plurality of exposures. The average luminance of these references images is computed. Using a Monte Carlo simulation to vary the luminescence variables of these reference images, survey participants are asked to select examples of the images that are most visually pleasing. Then, the survey results are converged to an acceptable resulting exposure having luminance variables correlated to the original input luminance.

The results are associated with the particular camera and are stored for later processing. When the RAW image 402 is received for processing, the auto-exposure adjustment computes the average luminance of the RAW image 402 and determines the exposure from the associated metadata. Then, using the stored survey results, auto-exposure adjustment determines which luminance variables to apply to the image 402 based on the average luminance and the exposure used so a pleasing result can be achieved. Finally, the luminance of the RAW image 402 is adjusted by the determined luminance variables in the automatic processing.

5. Interpolation Process

A fifth step of the RAW processing stage 400 involves an interpolation process 450, which is part of a demosaic (de- Bayering) process. The interpolation process 450 uses a number of sub-steps 451-458 that are culminated in a final chroma-blur operation 460 to produce a resulting RGB image. These sub-steps 451-458 includes creating a half-size green edge image (451), determining an interpolation direction map (452), constructing a green reconstruction image (453), sharpening the green reconstruction image (454), creating a blurred half-size RGB image (456), and constructing a red reconstructed image and a blue reconstructed image (453). Each of these steps 451-458 and 460 will be discussed below. Ultimately, the green, red, blue, and blurred RGB images from these sub-steps 451-458 are combined in a chroma-blur operation 460, which is also discussed below.

In general, the interpolation process 450 uses gradient based interpolation by first interpolating the luminance channel (i.e., the green channel) for the photo-sites of the RAW image 402, then interpolating the chrominance channels (i.e., the red and blue channels) for the photo-sites of the RAW image 402, and finally combining the channels to create the resulting RGB image having pixels with R, G, and B values.

a. Half-Size Green Edge Image

Figure 7:
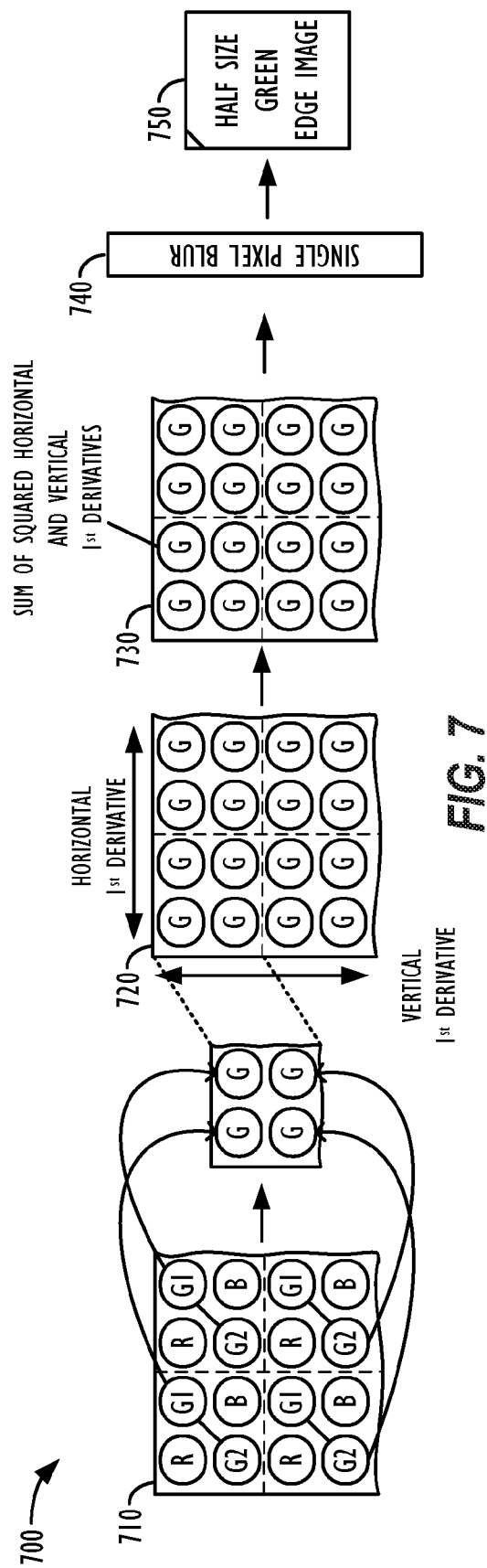
FIG. 7 illustrates one embodiment of a process of creating a half-size green edge image for the RAW processing stage of FIG. 4.

Because the human eye is sensitive to changes in luminance, edges are found in the green channel so that interpolation can be performed based on those edges. Sub-step 451 constructs a half-size green edge image from the RAW image 402 so the green edge image can indicate edges caused by changes in luminance of the original RAW image 402. FIG. 7 shows a process 700 for creating a half-size green edge image 750 from Bayer encoded data of a RAW image 710 (only a portion of which is shown). The RAW image 710 has a plurality of 2×2 cells with each cell having two green samples (G1, G2), one red sample (R), and one blue sample (B) that are photo-cites arranged in a Bayer pattern. Various patterns are known and used in the art, and the portion of the pattern shown here is only exemplary.

To create the half-size green edge image 750, only the green samples (G1, G2) of the Bayer-encoded RAW image 710 are used, and the red and blue samples are ignored. First, the two green samples (G1, G2) in each of the 2×2 cells of the RAW image 710 are averaged to produce a corresponding green value in an intermediate half-size green image 720. Thus, the half-size green image 720 has only green values and is half of the size of the original RAW image 710. Next, first derivatives (i.e., rates of change) for the values of the green samples (G) are calculated in both horizontal and vertical directions. Then, squares of the horizontal and vertical first derivatives for each of the values are summed to produce an edge image 730. Then, two passes of a single pixel blur process 740 are performed on the edge image 730 to produce a resulting half-size green edge image 750 that is blurred.

In the single pixel blur process 740, a first pass of the process 740 is performed over the edge image 730 with a center weight of 0.5 for the four neighbors of each pixel. Then, a second pass of the process 740 is performed over the previously blurred edge image 730 with a center weight of 0.125 for the four neighbors of each pixel to produce the resulting half-size green edge image 750. As shown in FIG. 4, the resulting half-size green edge image of this step 452 will be used in later processing by other steps.

b. Interpolation Direction Decision Map

Returning to FIG. 4, sub-step 452 of the interpolation process 450 creates an interpolation direction decision map that is used to decide how to fill in missing green values for those photo-sites having R or B channel located in the RAW image 402. In one embodiment, adjacent red and blue samples in each of the 2×2 cells of the Bayer pattern can be averaged to determine the missing green value for the photo-sites using standard demosaicing techniques. In a preferred embodiment, either vertical or horizontal neighboring samples in the RAW image 402 are used to determine the green channel for those samples that are red or blue. If a region of a generic image has horizontally oriented edges or stripes, for example, then it is preferred that horizontal neighbors of the R and B photo-sites in that region are used to determine their green channel value. If, on the other hand, the region of the generic image has vertically oriented edges or stripes, then it is preferred that the vertical neighbors of the R and B photo-sites in that region are used to determine their green channel values.

To determine the horizontal or vertical direction to be used for interpolation, the gradients of the R, G, and B channels of the RAW image 402 are calculated for each photo-site. Then, the gradients are mapped in an interpolation direction decision map that is used to decide how to fill in the missing green channel values at a given R or B photo-site in the RAW image 402. In general, the gradient for the green channel has the strongest influence in determining how to fill in the missing green channel values for the R or B photo-site if the gradient for the green channel shows that it is locally not changing. If the gradient of the green channel is changing locally, then the gradient of the non-green channel for the given photo-site is used to determine how to fill in its missing green value. The gradient of the green values at the photo-site can be determined by looking into the half-size green edge image at that location.

The determined directions for each photo-site are then input into the map as voting values. For example, a voting value of "1" corresponds to a decision for a horizontal direction in the map to be used in interpolating the missing green channel at the photo-site, while a voting value of "0" is a decision for a vertical direction to be used in interpolating the missing green channel at the photo-site. These voting values are then used in a voting process used to fill in the missing green channel values. The actual steps for filling in the missing green channel values are discussed with reference to the green reconstruction step 453 below.

c. Green Reconstruction Image

Figure 8:
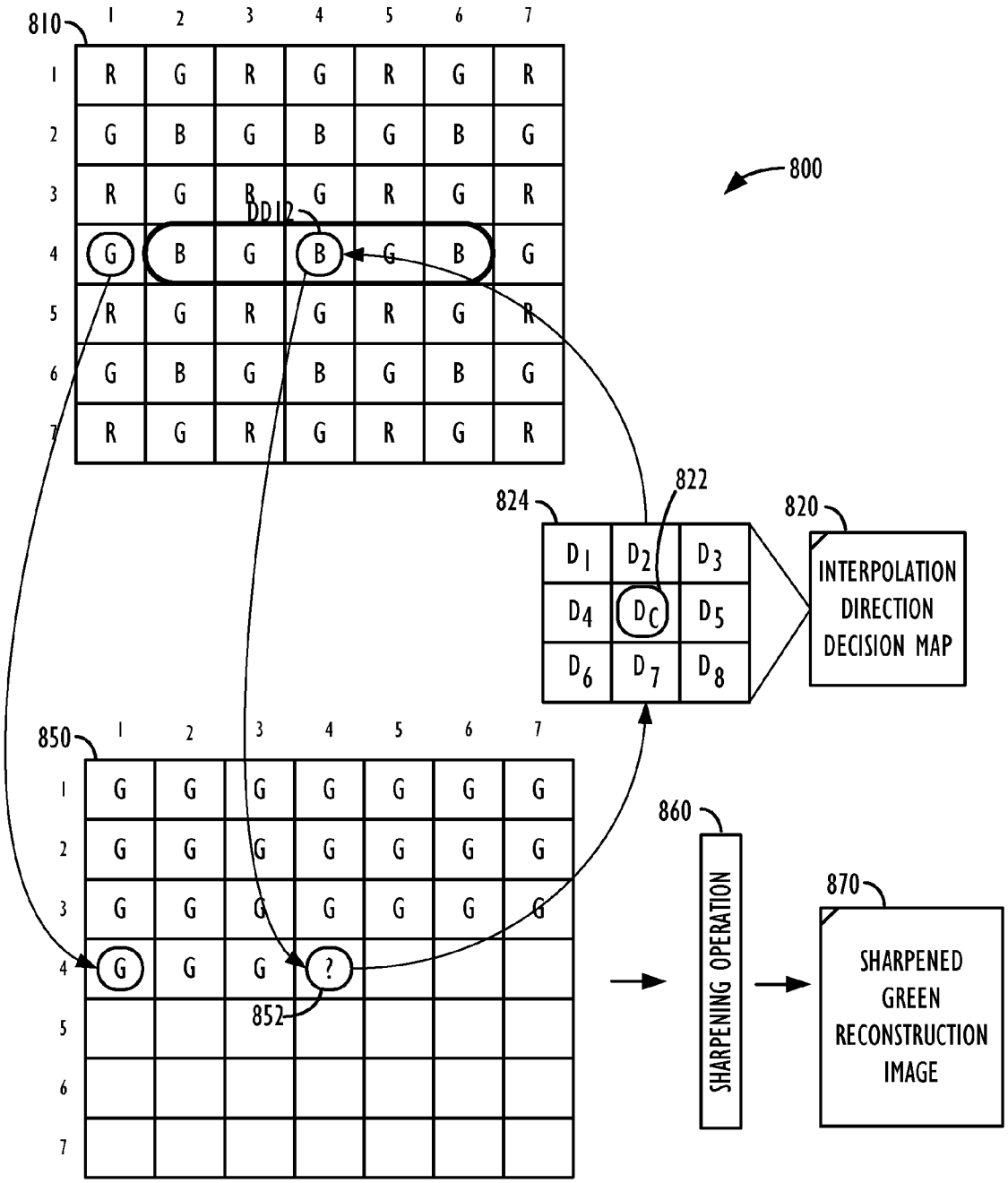
FIG. 8 illustrates one embodiment of a process of creating an unsharpened and a sharpened green reconstruction image for the RAW processing stage of FIG. 4.

Sub-step 453 of the interpolation process 450 creates a green reconstruction image using the original Bayer-packed image from step 440, the half-size green edge image from sub-step 451, and the interpolation direction decision map of sub-step 452. In FIG. 8, one embodiment of a process 800 for creating a green reconstruction image 850 is diagrammatically illustrated. To create the image 850, each of the green channels G for the photo-sites in the RAW image 810 are maintained for the corresponding photo-sites in the green reconstruction image 850. For example, the value for the green sample $G_{43}$ in the RAW image 810 is the same as that used in the green reconstruction image 850. However, the photo-sites for the R and B channels in the RAW image 810 do not have green values so their values in the green reconstruction image 850 must be interpolated using the interpolation direction decision map 820. For example, the selected photo-site 852 in the green reconstruction image 850 does not have a green value because it corresponds to the blue sample $B_{44}$ in the RAW image 810.

As alluded to above, a voting process is used to determine which direction to use when filling in the missing green values of the R and B samples. The voting process allows the neighborhood of the sample in the interpolation direction decision map 820 to be analyzed so that averages of the direction decisions within the neighborhood can be used to determine which direction to use for filling the missing green value.

The interpolation direction decision map 820 has a directionality vote at each pixel location. The voting process uses the decision map 820 and can be implemented in a number of ways. For example, the various direction decisions D in the map 820 can be "1" for horizontal and "0" for vertical. In one alternative, the single vote decision 822 corresponding to the selected photo-site 852 can be used alone to determine the direction for interpolation. In another alternative, a consensus of several votes from a neighborhood 824 of the decisions can be taken, and the consensus of the several decisions can decide which direction to use for interpolating the green value for the selected photo-site 852.

A full vote is one kind of consensus voting that can be used. The full vote uses a neighborhood 824 of decisions consisting of an odd number of samples (for example, a 3×3 or a 5×5 sample). A sum is computed of the decision values over the full neighborhood 824. If the sum is greater than half the total number of photo-sites in the neighborhood 824, then a "1" (horizontal direction) is used for the decision of the selected photo-site 852. Otherwise, a "0" (vertical direction) is used.

Pass-band voting is another kind of voting that can be used. In this kind of voting, a sum of neighboring photo-sites' decision values is computed (excluding the central decision 822 of the selected photo-site 852. If this sum is less than a predetermined threshold, the decision value is set to "0" (vertical direction) for the selected photo-site 852. If the sum is greater than another predetermined threshold, then the decision value is set to "1" (horizontal direction) for the selected photo-site 852. The thresholds depend on the size of the neighborhood 824 used. If the sum is equal to or between the thresholds, then the central decision 822 of the selected photo-site 852 is left alone.

With a 3×3 neighborhood 824, there are 8 neighboring decisions (when we exclude the center decision 822). With "wide pass-band voting," the lower threshold can be "2," and the upper threshold can be "6." With "narrow pass-band voting," the upper threshold can be "4," and the lower threshold can also be "4," indicating that the neighboring decisions must be exactly tied for the central decision 822 to be used. Wide pass-band voting is preferred because it may not affect the natural directional preference of the selected photo-site 852.

After determining the direction (vertical or horizontal) to use to determine the green value for the selected photo-site 852, then mathematical calculations use the samples in the RAW image 810 to determine the green value for the selected photo-site 852 in the green reconstruction image 850. First, an average of the two green samples in the chosen direction is used for the base result of the green value for the selected photo-site 852. In FIG. 8, for example, the determined direction is vertical, so that the average of the green values for the green samples $G_{43}$ and $G_{45}$ are determined and used as the base of the result (e.g., Green Result) for the selected photo-site 852. However, an adjustment is made to the Green Result based on the value of the corresponding sample (either red or blue) 812 in the RAW image 810. First, the Average of the corresponding sample's two, like neighbors in the sampling direction is calculated $$\left(\text{e.g.,}\quad Avgerage = \frac{(B_{42} + B_{46})}{2}\right).$$

Then, the Difference in value of the center sample 812 from the Average is calculated (e.g., Difference=$B_{44}$−Avgerage). This Difference is then scaled by how strong the green edge is for the corresponding sample 812 to produce a Scaled Difference. (The previously constructed green edge image of sub-step 451 of FIG. 4 can be used to determine the edge at the corresponding sample.) Finally, the resulting green value G for the selected photo-site 852 in the green reconstruction image 850 is computed as the Scaled Difference added to the Green Result. This has the effect of relying more on the values other channels (either R or B) in areas that have more of a green edge.

The entire process 800 is repeated until the green reconstruction image 850 is entirely filled with green values—i.e., those green values obtained directly from the RAW image 810 and those green values interpolated using the decision map and voting discussed above.

d. Green Sharpening

Returning to FIG. 4, a subsequent sub-step 454 of the interpolation process 450 performs a green sharpening operation on the green reconstruction image 850 from above. First, the green image is converted into a space as close as possible to perceptual gradation. Then the perceptually-graded reconstructed green image is blurred by the radius of the sharpening operation to produce the blurred reconstructed green image. The blurred reconstructed green image is subtracted from the perceptually-graded reconstructed green image to produce the green high-pass image. The green high-pass image contains the high-frequency information of the green reconstruction image. The green high-pass image is used for two purposes. The first purpose is to sharpen the image. A provisionally sharpened green reconstruction image is produced by adding a predetermined sharpening factor times the green high-pass image to the original image. The second purpose is to compute an edge mask so that the sharpening operation can be constrained to only operate on the edges of the image. The edge mask is produced by taking the absolute value of the green high-pass image, blurring it by a small amount, and then increasing its contrast by a large factor. The result is threshold at a predetermined level and clamped to the range 0 . . . 1 to produce the edge mask image. The edge mask image is used as a mask to decide which areas of the provisionally sharpened green reconstruction image are mixed with the green reconstruction image to form the sharpened green reconstruction image 870. Later, this sharpened green reconstruction image 850 will be combined with a red reconstruction image and a blue reconstruction image to produce an image having RGB values at each sample.

e. Blurred Half-Size RGB Image

Figure 9:
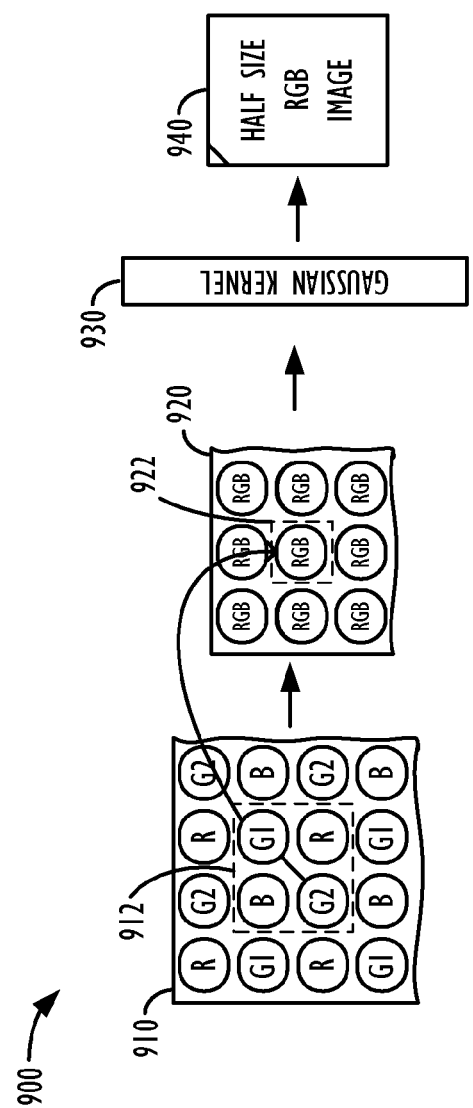
FIG. 9 illustrates one embodiment of a process of creating a half-size RGB image for the RAW processing stage of FIG. 4.

Returning to FIG. 4, sub-step 456 of the interpolation process 450 creates a blurred half-size RGB image, which will be used in the chroma-blur operation 460 discussed later. FIG. 9 shows an example of portion of Bayer encoded data of a RAW image 910 used as input to this step. First, green values (G) contributed to each pixel 922 in an intermediate half-size RGB image 920 are determined using an average of the two green photo-sites (G1, G2) in the 2×2 cells 912 of the original full size RAW image 610. The red and blue samples (R, B) are contributed to each pixel 922 based primarily on the single sample of those colors (R, B) found in the 2×2 cells 912 of the original full size image 910 along with a small contribution added from neighboring like color (R, B) samples using convolution resampling or similar technique. Finally, the intermediate half-size RGB image 920 is blurred with a Gaussian kernel 930 to produce the resulting half-size blurred RGB image 940. One or more other blur operations could also be used, including, but not limited to, a Gaussian blur, a selective blur, a bilateral filter, a median filter, and a box filter. This resulting image 940 has a blur to it so that it can be used in the chroma blur step 460 of FIG. 4 discussed later.

f. Red and Blue Reconstruction Images

Figure 10:
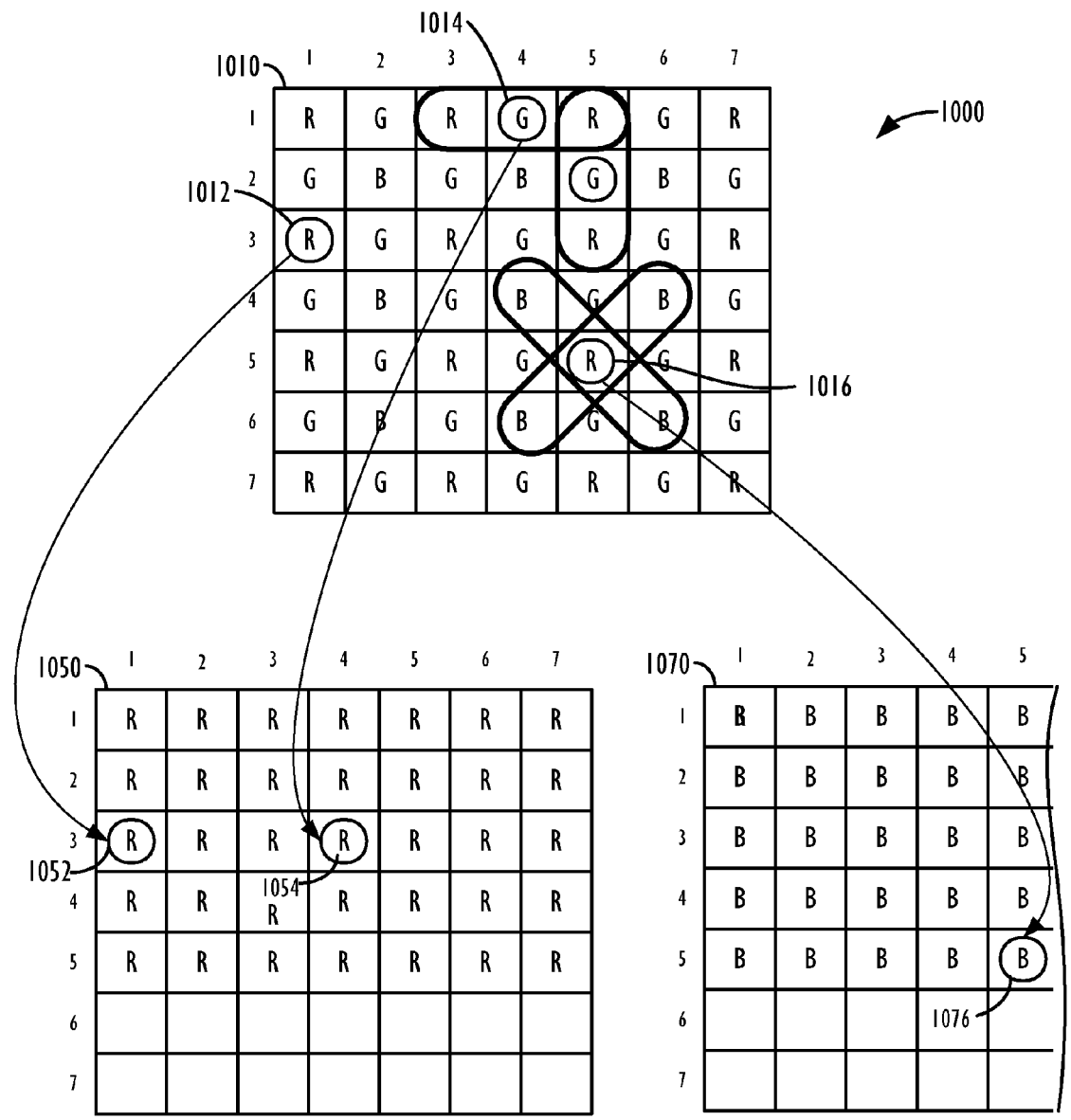
FIG. 10 illustrates one embodiment of a process of creating a red reconstruction image and a green reconstruction image for the RAW processing stage of FIG. 4.

In the interpolation process 450 of FIG. 4, sub-step 458 creates a red reconstruction image and a blue reconstruction image. FIG. 10 diagrammatically shows processes 1000 for creating a red reconstruction image 1050 and a separate blue reconstruction image 1070, which are only shown partially in FIG. 10.

In the reconstruction processes 1000, each photo-site in the RAW image 1010 is sampled. If the current sample of the RAW image 1010 is the right channel (i.e., R or B), then the value of the resulting sample in the reconstruction image (1050 or 1070) equals the value of the original sample plus a "green sharpening difference." At this point during operation, the RAW image process 400 of FIG. 4 has developed a sharpened green reconstruction image (sub-step 454) and an unsharpened green reconstruction image (sub-step 453). The "green sharpening difference" is the difference between the green channel at that sample point in the sharpened green reconstructed image (from sub-step 454) and the green channel at that sample point in the unsharpened green reconstruction image (from sub-step 453). The "green sharpening difference" has the effect of applying any green sharpening to the red and blue channels as well when reconstructing them. In reconstructing the red reconstruction image 1050 in FIG. 10, for example, the current sample 1012 is the right R channel, and the resulting red photo-site 1052 in the red reconstruction image 1050 is the value of the original sample 1012 plus the "sharpening difference."

If the current sample in the RAW image 1010 is not the right channel (R or B), then a determination is made whether the current sample has direct horizontal or vertical neighbors of the desired channel. If so, the average of the horizontal or vertical neighbors is taken, and the "green sharpening difference" is added on to produce the resulting sample in the reconstruction image. In reconstructing the red reconstruction image 1050 in FIG. 10, for example, the current sample 1014 is not the right channel (i.e., not R). Therefore, the resulting red photo-site 1054 in the red reconstruction image 1050 is the average of the horizontal neighbors of the right channel (i.e., R) plus the "sharpening difference" discussed previously.

If the current sample in the RAW image 1010 is not the right channel and does not have direct horizontal or vertical neighbors of the right channel, the average of all four diagonal neighbors is calculated, and the "green sharpening difference" is added on to produce the resulting sample in the reconstruction image. In reconstructing the blue reconstruction image 1070 in FIG. 10, for example, the current sample 1016 is the not the right channel (i.e., B for the blue reconstruction) and does not have horizontal or vertical neighbors of the correct B channel. Therefore, the resulting blue photo-site 1076 in the blue reconstruction image 1070 is the average of the diagonal neighbors of the right channel (i.e., B) plus the "green sharpening difference" discussed previously. The end result of the reconstruction process is a red reconstruction image 1050 and a blue reconstruction image 1070 that can be stored in buffers until combined in later processes to produce a resulting RGB image.

g. Chroma Blur Operation

Figure 11:
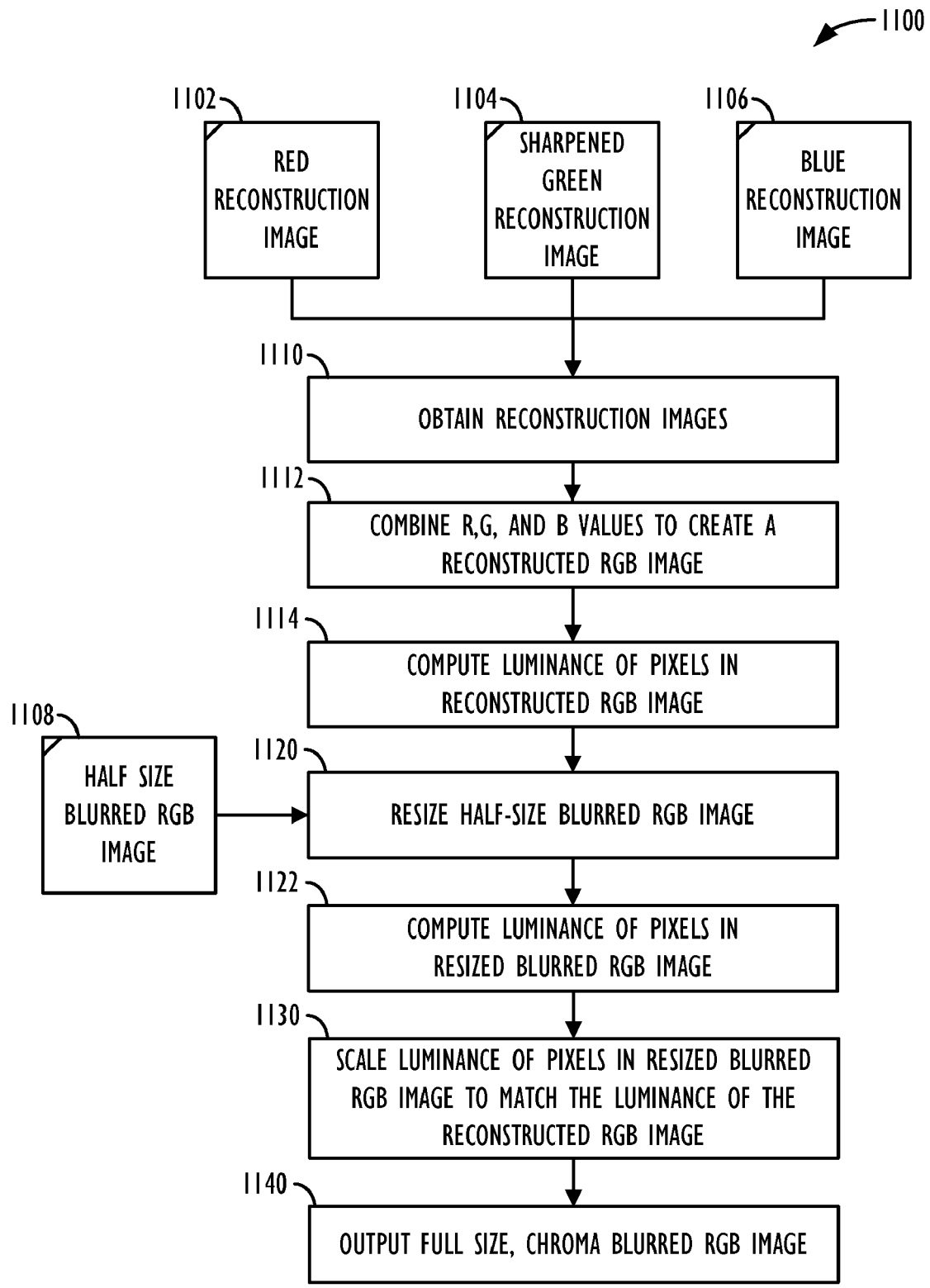
FIG. 11 illustrates one embodiment of a chroma blur operation for the RAW processing stage of FIG. 4.

Finally, a chroma-blur operation 460 in FIG. 4 uses the sharpened green reconstructed image from sub-step 454, the half-size blurred RGB image from sub-step 456, and the red and blue reconstructing images from sub-step 458 to produce a full RGB image. FIG. 11 illustrates one embodiment of a chroma blur operation 1100 for the automated processing of FIG. 4. Initially, the red reconstruction image 1102, the sharpened green reconstruction image 1104, and the blue reconstruction image 1106 from previous processing are obtained (Block 1110), and a reconstructed RGB image is created by combining each of the individual R, G and B sample values from them as RGB pixels in a reconstructed RGB image (Block 1112). The luminance of the reconstructed RGB image at each pixel is then computed (Block 1114). Then, bilinear interpolation is used to resize the half-sized blurred RGB image 1108 into a full size blurred image (Block 1120), and the luminance of each pixel in the full sized blurred image is computed (Block 1122). Then, the luminance of the blurred color in the full-size blurred image at each pixel is scaled to match the luminance of the reconstructed RGB image (Block 1130). Finally, a full size RGB image that has reduced color fringing results from this fast chroma blur operation 1100 (Block 1140).

E. Details of Conversion Stages in the Raw Image Processing Pipeline

1. Derivation of Characteristic Matrices

Figure 12:
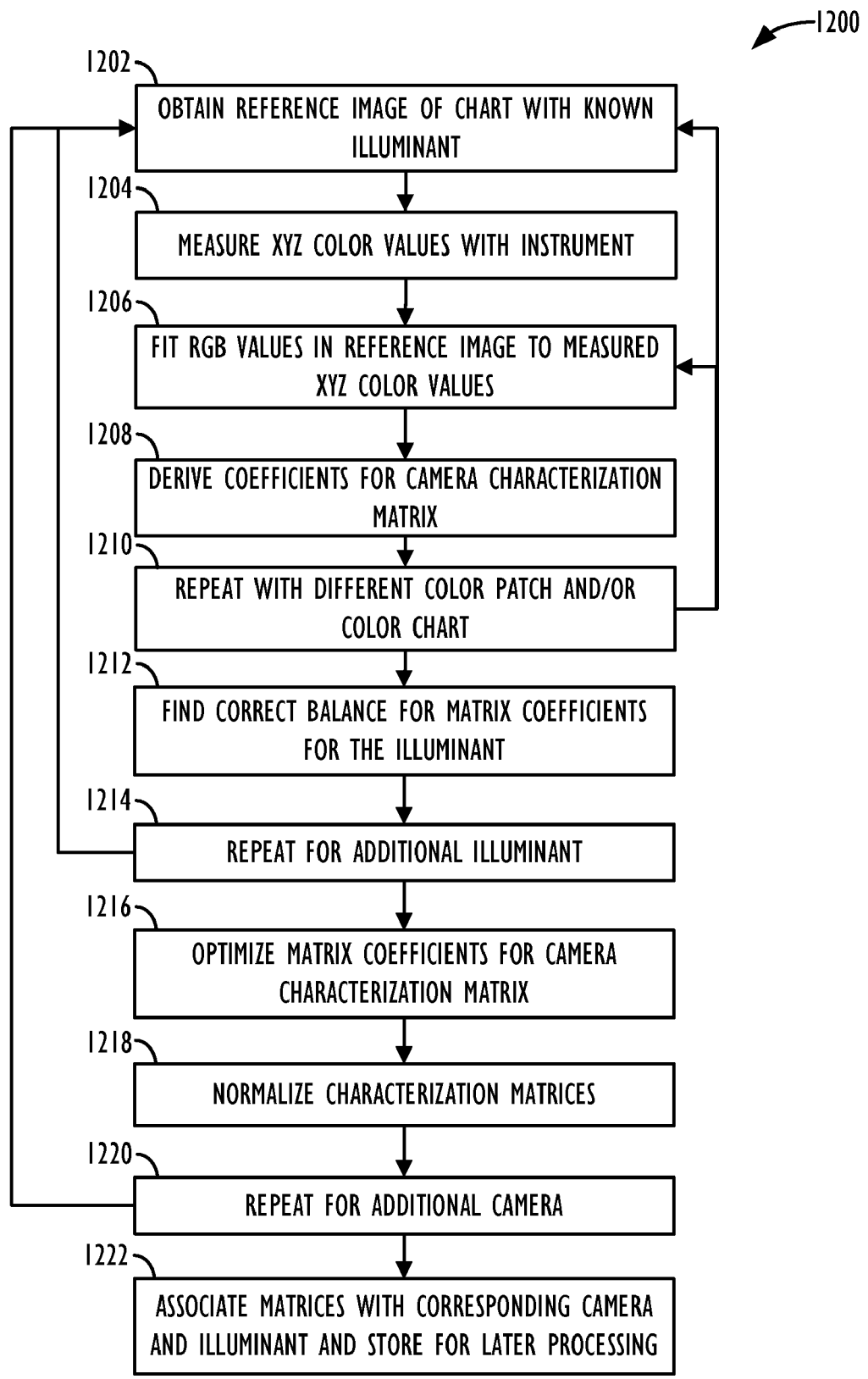
FIG. 12 illustrates one embodiment of a process for deriving characteristic matrices for use in the first conversion stage of FIG. 3.

As alluded to previously in Block 334 of FIG. 3, characteristic matrices for converting the camera RGB image to XYZ tristimulus values are pre-calculated and used in conjunction with the white balance of the image to estimate the optimum matrix conversion from camera RGB to XYZ tristimulus values. In FIG. 12, one embodiment of a process 1200 for deriving characteristic matrices for conversion in automated RAW processing is illustrated in flowchart form. In the process 1200, a plurality of camera characterization matrix (e.g., $M_1$, $M_2$, etc.) are derived for a plurality cameras, types of cameras, models of cameras, manufactures, imaging sensors, or other categories. The process 1200 is intended to eliminate user intervention and subjectivity in choosing interpolation matrices during the RAW processing of FIG. 3 and automatically derives parameters for RAW conversion per camera, type, manufacturer, or other category.

Initially, a reference image of a color chart (e.g., a Macbeth Color Checker) or the like is obtained using a specific camera and one known illuminant (e.g., illuminants A, D65, etc.) (Block 1202). This will not be the only reference image generated by this camera. As will be detailed below, a plurality of such reference images are obtained for a given camera, a type of camera, a model of camera, a camera manufacturer, type of imaging sensor of the camera, or other category. The reference image may be made in a lab, and the color chart may contains various color patches, highlights, shadows, etc. and may be positioned in a lighting box having a plurality of standard illuminants.

Under the same illuminant, XYZ color values are measured for various color regions or patches from the color chart using a standard instrument, such as a calorimeter (Block 1204). Then, the RGB values for the regions are mathematically fit to the corresponding XYZ tristimulus values measured for those regions (Block 1206). The fitting process involves solving for matrix coefficients in a matrix that will correlate the RGB values of the reference image with the XYZ tristimulus values measured from the chart. Due to the tristimulus color spaces involved, the matrix will likely be 3×3 so that there are nine variables involved in solving for the fit. In the fitting process, the original white balance of the reference image is ignored. Thus, the fitting process does not assume the camera is calibrated because the original white balance is ignored. Instead, a fixed white balance is used in solving for the matrix coefficients. White balance is typically expressed as a vector $\vec{p}$ having three value. For the fitting process, each value of the vector $\vec{p}$ is equal to one so that any influence of white balance in the fitting process is not recognized.

In the fitting process, a number of color patches or regions of the chart are preferably used to derive the coefficients of the matrix. Accordingly, the process 1200 can be repeated for different color patches of the same color chart under the same illuminant and/or different color charts under the same illuminants (Block 1210). Then, a balance is found for the coefficients of the derived matrix so that they will have a proper weighting to correlate RGB values of various colors to measured XYZ tristimulus values measured for those various colors using the same illuminant (Block 1212). Ultimately, the process 1200 derives a first characterization matrix $M_1$ for this first camera and this first illuminant. This first matrix $M_1$ is a 3×N matrix with n corresponding to the number of channels (e.g., R, G, B) for the camera.

After deriving the first camera characterization matrix M1, the Blocks of 1202 through 1212 are repeated one or more times for one or more additional illuminants using the same camera previously used (Block 1214). Previous measurements of the one or more color charts can be reused. The result of repeating these steps is a plurality of camera characterization matrices for different illuminants but the same camera. The matrix coefficients of these matrices are optimized or adjusted to reduce color error when various images are matched to corresponding measurements of one or more color chart under the various illuminants (Block 1216). This can be done using tests and adjustments. Once optimized, the coefficients of each matrix are normalized using a normalization factor for that particular matrix (Block 1218). Preferably, the normalization factor for a given matrix is the sum of the diagonal coefficients of the matrix so that each coefficient of the matrix is divided by this sum.

Finally, the entire process of blocks 1202 through 1218 can be repeated for one or more additional cameras, models, etc. (Block 1220). The result will be a plurality of camera characterization matrices. Each of these camera characterization matrices will be associated with a corresponding illuminant and one camera, type, model, manufacture, or the like. These camera characterization matrices are then stored for later access when interpolation is performed in subsequent processing discussed below with reference to FIG. 14 (Block 1222).

As noted above, the plurality of camera characterization matrices can be made for the camera in a lab and stored for later access during the automatic RAW image processing of the present disclosure. Thus, a plurality of cameras can have their own camera characterization matrices stored in memory. During the automatic pre-processing, the metadata for a RAW image can then be used to select the appropriate camera characterization matrices for the image form memory. In addition to having predetermined matrices for cameras, users can independently create characterization matrices for their cameras by using the techniques above and carefully constructing a lighting environment and using a color calibration target.

2. Derivation of Black Compensation

Figure 13:
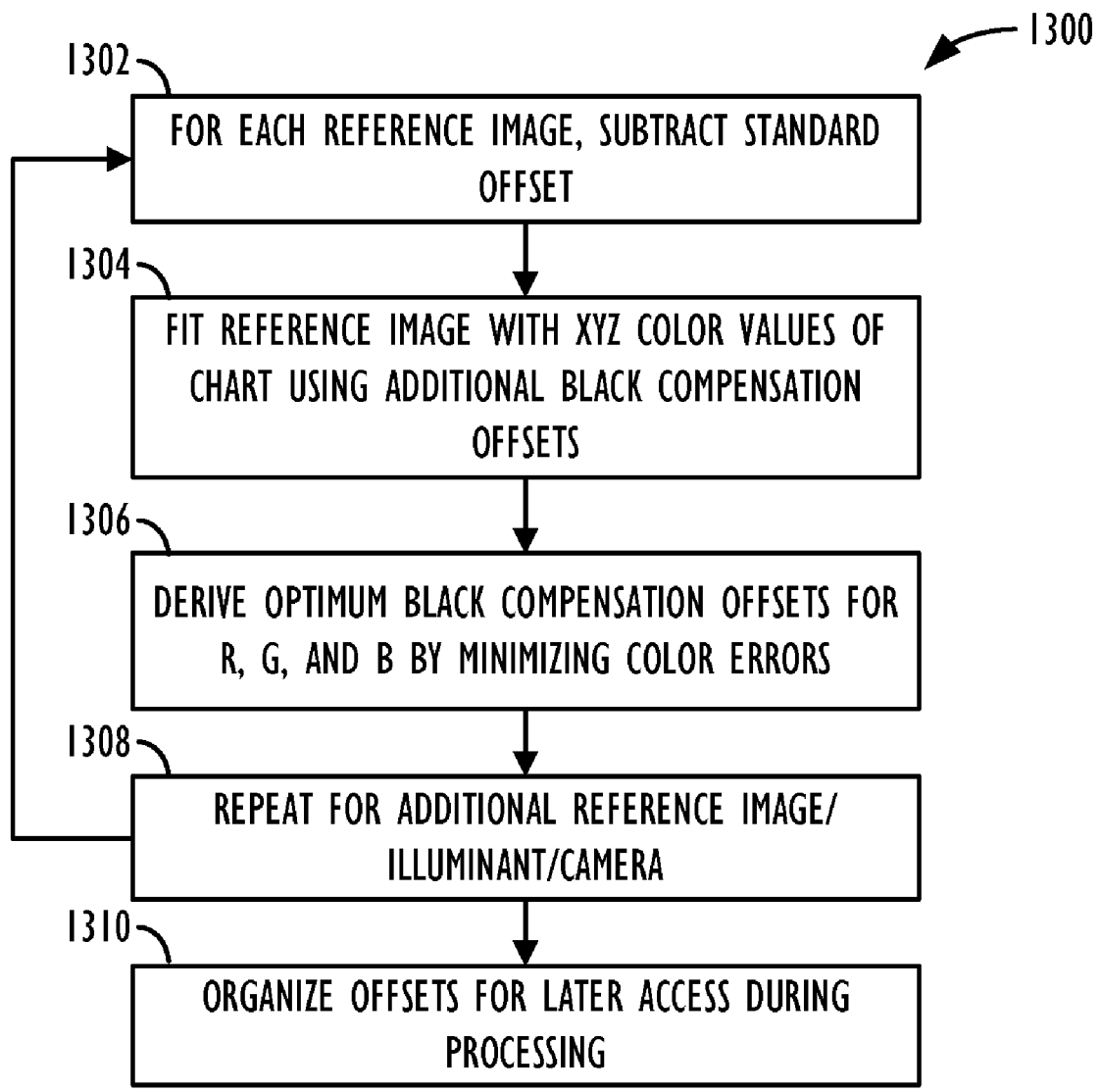
FIG. 13 illustrates one embodiment of a process for deriving black level adjustments for use in the first conversion stage of FIG. 3.

As noted previously in FIG. 3, a black compensation process 330 is performed on the camera RGB image 329 within the first conversion stage 302 to XYZ color space. The process 330 uses a derived black level adjustment to make the compensation. The black level adjustment is embodied in the camera characterization matrices ($M_1$ and $M_2$) derived for the camera and is performed by the conversion matrix (M) generated from those characterization matrices and from the white balance information received from the camera. FIG. 13 illustrates one embodiment of a process 1300 for deriving a black level adjustment for use in the automated RAW processing of the present disclosure.

The process 1300 of deriving black compensation values is incorporated into the process of deriving the camera characterization matrices discussed above with reference to FIG. 12. As discussed previously, the matrix derivation process 1200 of FIG. 12 involves obtaining a reference image of a chart using a known illuminant. Part of that step further involves subtracting the standard black level off set (if any) for the captured image (Block 1302). Then, as before, the RGB tristimulus values for regions in the reference image are fit to the measured XYZ tristimulus values from the color chart to derive the characterization matrix (Block 1304). This fitting process produces an amount of fitting error regardless of how many color patches are analyzed because of the number of variable of the coefficient of the characterization matrix— i.e., the nine variable for a 3×3 matrix.

To reduce the error, variables for black compensation are used in the fitting process. One each of these black compensation variables is subtracted from one of the color channels (R, G, B) of the reference image. In this way, Block 1304 will fit the RGB tristimulus values of the reference image to the measured XYZ tristimulus values using 12 variables (i.e., nine from the matrix and three for the offsets of the RGB channels). Derivations are then performed with values of the black compensation variables in the fitting process of Block 1304 until the color error is reduced to a threshold level (Block 1306). In this way, an optimum black compensation variable for each color channel is derived by minimizing the color error between the two color sets—the measured one and the estimated one in the reference image. These black compensation variables represent an addition black adjustment in addition to the standard black offset.

The black compensation variables can then be organized and stored for later access during processing (Block 1310). To organize the black compensation variables, for example, they can be associated with the characterization matrix for the corresponding camera and illuminant used to derive them. Thus, each characterization matrix can have associated black compensation variables. In addition, the black compensation variables can be associated with the different conditions used to derive them. These conditions can include, but may not be limited to, the illuminants used, the image content, the white point camera settings, and ISO sensitivities involved. Different dependencies between black compensation variables can be averaged between groupings if the values of the variables exhibit characteristics of clustering. Moreover, the different black compensation variables can be differentiated and classified based on these various conditions if the variables are divergent.

The process 1300 provides more objective and consistent determination of an optimum black level compensation to be used in RAW image processing. In the pipeline 300 of FIG. 3, for example, these black compensation variables can be initially subtracted from the RGB tristimulus values of the camera RGB image 329 at step 330 before matrix conversion is performed so as to reduce color error in the conversion. Selection of which set of black compensation variables to use can be based on the camera, type, model, etc. in the metadata 314. In addition, selection can be based on the different internal shooting conditions (such as camera ISO setting, exposure time, etc.) or external conditions such as illuminants, which can also be indicated in the information of the metadata 314.

In addition, selection of which black compensation variables to use during processing can be based on an average or an interpolation between sets of variables. As noted previously, a first set of black compensation variables are derived for a first illuminant and associated with a first characteristic matrix M1, and a second set of black compensation variables are derived for a second illuminant and associated with a second characteristic matrix $M_2$. The two sets can be stored and associated with the characteristic matrices $M_1$ and $M_2$ used to calculate an optimum conversion matrix M discussed in the next section. In one embodiment, optimum black compensation variables are calculated from a fix average between the first and second sets of variables associated with the characteristic matrices $M_1$ and $M_2$ used to calculate the optimum conversion matrix M discussed below. Alternatively, the optimum black compensation variables are calculated using linear interpolation between the sets of black compensation variables. The linear interpolation applies the same interpolation factor used to calculate the optimum conversion matrix M discussed below.

3. Calculating Conversion Matrix

As alluded to previously in the RAW image processing of FIG. 3, a matrix conversion process 332 is performed on the camera RGB image 329 to covert it to XYZ tristimulus values. The process 332 uses a conversion matrix M to make the transformation. The conversion matrix M is 3×N matrix, where n is the number of channels for the camera. The conversion matrix M depends on the white balance and at least two pre-computed camera characteristic matrices corresponding to two reference illuminants and is calculated based on the particular camera, type of camera, manufacture, etc. used.

Figure 14:
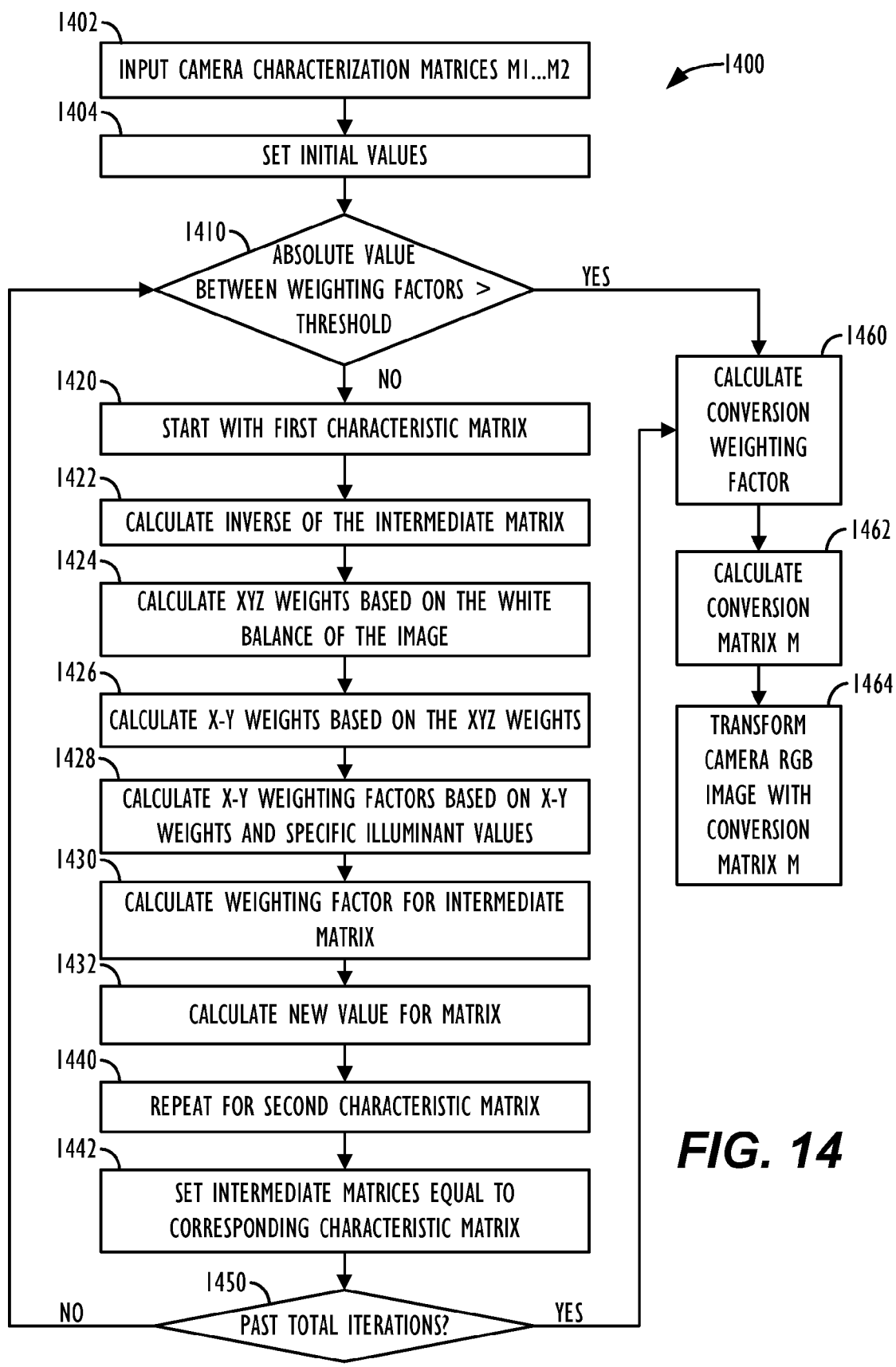
FIG. 14 illustrates one embodiment of a process for deriving a conversion matrix for the first conversion stage of FIG. 3.

FIG. 14 illustrates one embodiment of a process 1400 for calculating a conversion matrix (M) for use in the automated RAW processing of the present disclosure. The process 1400 is performed dynamically per image at the time of conversion and finds a conversion matrix M to convert camera RGB to XYZ tristimulus values using the white balance from the camera per image and using the predefined characteristic matrices corresponding to at least two reference illuminants.

In particular, the conversion matrix M is derived from characterization matrices $M_1$ and $M_2$ and the camera's unique white balance information $\vec{p}$, which is image dependent and is provided by the camera as metadata (e.g., 314 of FIG. 3). The white balance information $\vec{p}$ is a vector of three values, which when normalized has only two significant elements because the third one equals 1. Through an iterative process, a matrix equation for the image's white point W is solved using $M_1$, $M_2$ and using the white balance $\vec{p}$ of the image. The solution converges to a unique matrix M and a unique white point W.

The process 1400 solves for a conversion matrix M that can be specified for a given type of camera, a given style of camera, an individual camera, a manufacturer, or other characteristic and finds a chromaticity scaling factor and suitable white balance that will derive an optimal conversion matrix M. In the process 1400 discussed below, only two characterization matrices $M_1$, $M_2$ are used. Other embodiments can use more than two characterization matrices, which may generally improve the interpolation.

As noted above with reference to FIG. 6, a plurality of characterization matrices $M_1$, $M_2$, ..., $M_n$ for the given camera are produced by tacking images of the same scene under different illuminants. For example, $M_1$ may be the camera characterization matrix made with illuminant A (xa=0.4476, ya=0.4074), and $M_2$ may be the camera characteristic matrix made with illuminant D65 (xd=0.3127, yd=0.3290). The illuminants can be represented as vectors in either XYZ space or CIE-1931 chromaticity space x, y.

The plurality of characterization matrices $M_1$, $M_2$, ..., $M_n$ are ordered based on the correlated color temperature from 1 to n. The most distant illuminants are then used to estimate the actual illuminant of the scene by deriving a preferred conversion matrix M for the given camera that converges to the estimated illuminant in the RAW image being processed. Initially, previously determined camera characterization matrices $M_1$ and $M_2$ are input (Block 1402) and initial values are set (Block 1404). The initial values include a first intermediate matrix ma1 set equal to the first characterization matrix $M_1$ and a second intermediate matrix ma2 set equal to the second characterization matrix $M_2$. These intermediate matrices ma1 and ma2 initialized to $M_1$, $M_2$ will eventually be converged to a preferred conversion matrix M through an iterative process described below. A maximum number of iterations K is set to zero, and a limit of total iterations N is set to 20, for example. In addition, a first scaling factor fa1 for the chromaticity of the white point is set equal to 1, and a second scaling factor fa2 for the chromaticity of the white point is set equal to 0.

A threshold T used to determine convergence is also set to a value, such as 0.001, so that the process will be repeated until the absolute value of the difference between the first and second chromaticity scaling factors fa1 and fa2 is under the threshold. Using this threshold, the iterative process may typically require between 3 and 5 interpolation steps for most cameras. In an alternative embodiment, the difference between the norm of the matrices ma1 and ma2 can be calculated for comparison to a threshold. In the example below, however, the first and second chromaticity scaling factors fa1 and fa2 are used to measure convergence because they are already computed scalars.

Initially, a determination is made whether the absolute value of the difference between the first and second chromaticity scaling factors fa1 and fa2 is greater than the preset threshold T (Block 1410). For the first iteration, of course, the chromaticity scaling factors fa1 and fa2 are 1 and 0 respectively, which will be greater then the threshold T. Processing then starts with the first characteristic matrix M1 (Block 1420).

For the first characteristic matrix M1, the inverse of the intermediate matrix ma1 is calculated (Block 1422). Then, weights in the XYZ color spaces are calculated based on the white balance of the image (Block 1424). For example, Xw=mi[0][0]/p[0]+mi[0][1]/p[1]+mi[0][2]/p[2]; Yw=mi[1][0]/p[0]+mi[1][1]/p[1]+mi[1][2]/p[2]; and Zw=mi[2][0]/p[0]+mi[2][1]/p[ ]+mi[2][2]/p[2]. Next, x-y weights are calculated based on the xyz weights (Block 1426). For example, xw=Xw/(Xw+Yw+Zw), and yw=Yw/(Xw+Yw+Zw). X-Y weighting factors are calculated based on the x-y weights and specific illuminant values associated with the image (Block 1428). For example, fx1=(xw-xa)/(xd-xa), and fy1=(yw-ya)/(yd-ya).

Then, the first chromaticity factor fa1 for intermediate matrix ma1 is calculated as fa1=sqrt(fx1*fx1+fy1*fy1) (Block 1430). Finally, a new value is calculated for the first characteristic matrix M1 as M1=(1-fa1)*ma1+fa1*ma2 (Block 1432).

A similar process is then repeated for second characteristic matrix M2 (Blocks 1440) using the following equations:

$$mi = \text{Inverse}(ma2);$$

$$Xw = mi[0][0]/p[0] + mi[0][1]/p[1] + mi[0][2]/p[2];$$

$$Yw = mi[1][0]/p[0] + mi[1][1]/p[1] + mi[1][2]/p[2];$$

$$Zw = mi[2][0]/p[0] + mi[2][1]/p[1] + mi[2][2]/p[2];$$

$$xw = Xw/(Xw+Yw+Zw); yw = Yw/(Xw+Yw+Zw);$$

$$fx2 = (yw - xa)/(xd - xa);$$

-continued $$fy2 = (yw - ya)/(yd - ya);$$

$$fa2 = sqrt(fx2 * fx2 + fy2 * fy2);$$

$$m2 = (1 - fa2) * ma1 + fa2 * ma2;$$

Once the first and second characteristic matrices M1 and M2 have been calculated as above, the intermediate matrices are set equal to corresponding characteristic matrix ma1=m1 and ma2=m2 (Block 1442).

Finally, the process 1400 may repeat as long as the convergence threshold T (Block 1410) or total allowed iterations (Block 1450) has not been met. If the process 1400 has exceeded a set total iterations K (Block 1450), then the process 1400 is forced to stop and proceeds to Block 1460. Otherwise, the process 1400 will return to Block 1410 to see if the threshold T has been exceeded and repeat another iteration of converging the characteristic matrices $M_1$ and $M_2$ further if needed. If the threshold T has not been exceeded, then Blocks 1410 through 1450 are repeated for another iteration to converge the characteristic matrices.

In any event, once convergence has been achieved or the total number of iterations exceeded, a final chromaticity scaling factor is calculated as fa=(fa1+fa2)/2 (Block 1460). Finally, a resulting conversion matrix M is determined by first calculating m=(1−fa2)*ma1+fa2*ma2 and then calculating M=Inverse(m) (Block 1462). This resulting conversion matrix M can then be used in automatic processing of a RAW image for the particular camera regardless of the particular light source used by transforming the camera RGB image with the conversion matrix M (Block 1464).

4. Derivation of Tone Reproduction Curve

As alluded to previously in the RAW image processing pipeline 300 of FIG. 3, a color tuning process 342 and a transformation process 344 are used to convert the XYZ tristimulus values to produce a resulting RGB image 349. The conversion is done using a conversion matrix M of 3×n, where n is the number of channels per camera (e.g., R, G, and B) as discussed above. In addition, the conversion is done using a tone reproduction curve that is intended to optimize the image rendition from a linear space to a display or output space. Therefore, the tone reproduction curve used in the color tuning process 342 affects the appearance of the image, contrast, shadow, highlight detail, and the overall image quality.

Figure 15A:
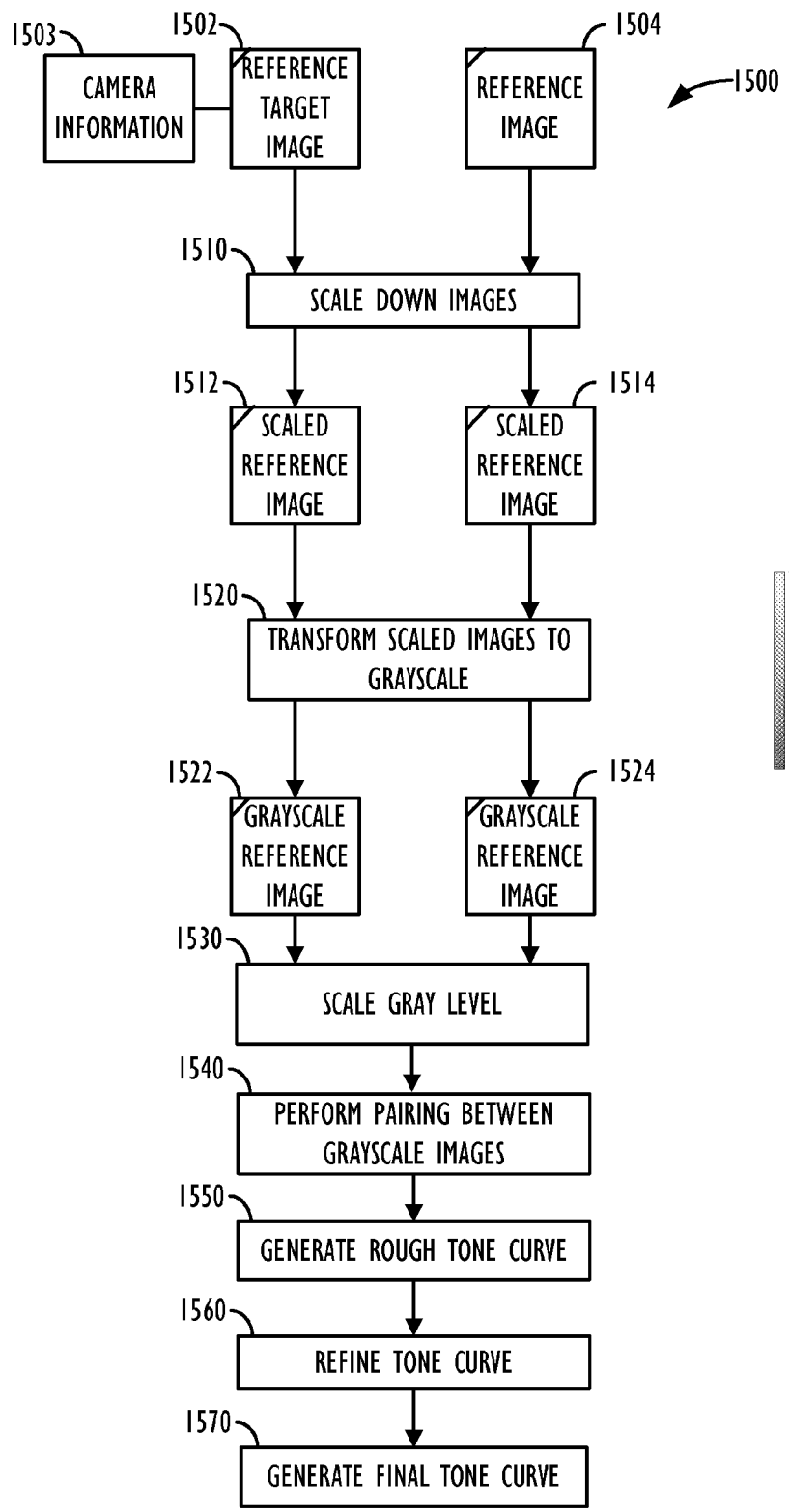
FIGS. 15A-15C illustrate one embodiment of a process for deriving a tone reproduction curve for use in the second conversion stage of FIG. 3.
Figure 15B:
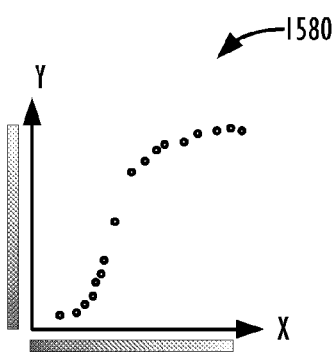
Figure 15C:
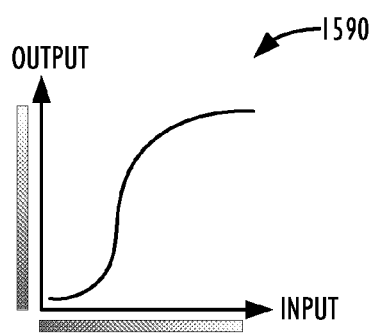

FIGS. 15A-15C illustrates one embodiment of a process 1500 for deriving a tone reproduction curve for use in the automated RAW processing of the present disclosure. The process 1500 can automatically derive an optimized tone reproduction curve for a particular camera, type or brand of camera, manufacturer, or other camera-related criteria so that the tone reproduction curve can be automatically used in the color tuning process (342) of FIG. 3 when doing RAW processing for the particular camera, type or brand of camera, manufacturer, or other camera-related criteria.

Initially in the derivation process 1500, a number of reference images 1502, 1504 are selected. In FIG. 15A, only two reference images 1502, 1504 are shown for convenience. A first of the reference images 1502 is associated with camera information 1503, i.e., a particular camera, style of camera, manufacture, etc. This reference image 1502 is referred to as the target reference image. One or more other reference images 1504 can be produced by the same or a different camera and may have been processed using different techniques and processing software. Each of the reference images 1502, 1504 contain the same scene (e.g., color chart or the like) using the same settings, illuminant, etc. Preferably, the other reference image 1504 contains highlights, shadow, a good distribution of tones, and a distribution of under exposed to over exposed images. Accordingly, the other reference image 1504 may have undergone some automatic and/or manual manipulation using image processing software. In general, the reference images 1502, 1504 can be generated in a lab so that the scene, exposure, size, etc. between the images can be substantially the same. However, embodiments of the RAW processing disclosed herein may allow for a user to independently generate reference images to generate tone reproduction curves.

The color of each pixel in the reference images 1502, 1504 depends on the sensor of the camera used, the demosaicing process applied, the noise reduction algorithm applied, and other details used to produce them. Consequently, the two images 1502, 1504 will not likely have a pixel-to-pixel correspondence of color even though they are of the same scene because there still will be differences in the imaging sensors used to capture the images, differences in noise reduction, difference in demosaicing processes used, and other possible reasons.

In a first step 1510, the images 1502, 1504 are scale down to a size intended to reduce the effects of demosaicing differences and the noise artifacts between them. Scaling will usually be necessary because debayering, highlight recovery, size of the images, and other details will likely not be the same for the two images 1502, 1504. A low pass filter is preferably used to averages pixel colors into regions. The result is two scaled reference images 1512, 1514 having substantially the same size. In one optional step (not shown), gamma correction of the reference images 1512, 1514 can be performed if necessary.

In a second step 1520, the scaled images 1512, 1514 are transformed to grayscale images 1522, 1524. The images 1512, 1514 can have a gray ramp patch that may help in the conversion of the images from color to grayscale. The scaling down of the images and the reduction from color to grayscale is intended to reduce effects or differences of noise and demosaicing between the original images 1502, 1504.

In a third step 1530, a gain factor is determined that matches the maximum brightness of the second image 1524 to the maximum brightness of the first target image 1522. Then, the gray levels of the second image 1524 are scaled with this gain factor. In a fourth step 1540, a pairing between the grayscale images 1522, 1524 is done that compares the pixel-to-pixel grayscale values between the images 1522, 1524. In a fifth step 1550, the one-to-one pixel pairing between the grayscale target image 1522 and the grayscale reference image 1524 is then plotted as a rough tone curve of y=f(x), where x is the gray level of the reference image 1524 and y is the gray level of the target image 1522. An example of such a rough tone curve is shown in graph 1580 of FIG. 15B. In a sixth step 1560, the rough tone curve is refined using interpolation, averaging, and smoothing for missing gray levels of x or for discontinuities of the curve. In addition, any plotted values that are aberrations or due to error can be removed during this refinement. In a final step 1570, a final tone reproduction curve is generated. An example of such a final tone curve is shown in graph 1590 of FIG. 15C. Typically, the tone reproduction curve has an S-shape that boosts color saturation and luminance contrast of the image to produce pleasing results for each camera model. In one example, the tone reproduction curve can be described by four third-degree polynomials that are continuous.

This tone reproduction curve 1590 can then be used in the automatic color tuning process (342) of FIG. 3 when the camera (310) for which RAW processing is done meets the criteria of the initial camera information 1503 associated with the target reference image 1502 used to generate the tone reproduction curve 1590. Accordingly, a plurality of tone reproduction curves 1590 are generated for a plurality of different cameras, types of cameras, and other criteria. In this way, when a tone reproduction curve is obtained in Block 346 of the process of FIG. 3, the metadata 314 from the camera 310 for the image being processed can be used to select the appropriate tone curve from a pool of pre-stored and configured tone curves.

In the present embodiment of the process 1500 of FIG. 15A, the final tone reproduction curve was generated using grayscale instead of distinct color channels (e.g., R, G, B). When this tone reproduction curve is used in the automatic color tuning process (342) of FIG. 3, it will essentially be applied to each channel in the same way. In an alternative embodiment, a similar process as that disclosed above can be used to generate a separate tone reproduction curve for each color channel of the image so that the automatic color tuning process (342) of FIG. 3 can then apply the separate tone reproduction curves to each channel independently for the color tuning. For example, the reference images 1502, 1504 may undergo filtering to produce separate images for each channel. Then, the images associated with each channel can under the stages of the process 1500 to produce an independent tone reproduction curve for the associated channel that can then be applied to each channel of an image being processed.

F. Additional Processes in the Raw Image Processing Pipeline

Figure 16A:
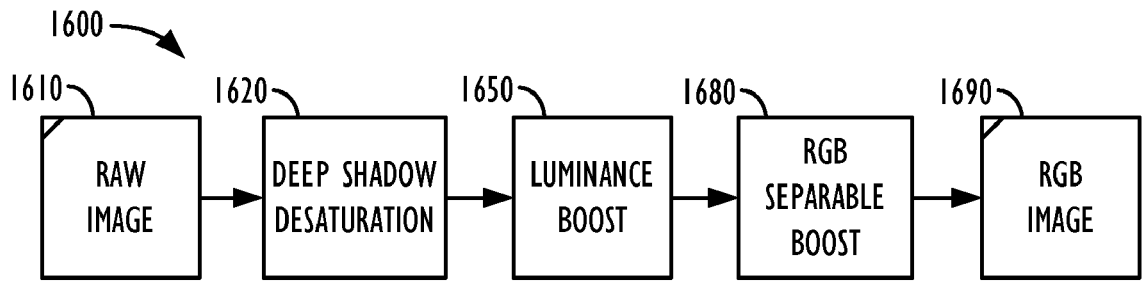
FIG. 16A illustrates additional automated processes for the automated RAW image processing pipeline of FIG. 3.

In FIG. 16A, a plurality of additional automated processes 1600 are shown for the RAW processing of an original RAW image 1610 to a resulting RGB image 1690. These automated processes 1600 include a deep shadow de-saturation process 1620, a luminance boost 1650, and an RGB separable boost 1680. When and where these processes are actually implemented in the RAW image processing pipeline 300 of FIG. 3 depends on specifics of the camera, the RAW image, and other characteristics.

1. Deep Shadow De-Saturation Process

Figure 16B:
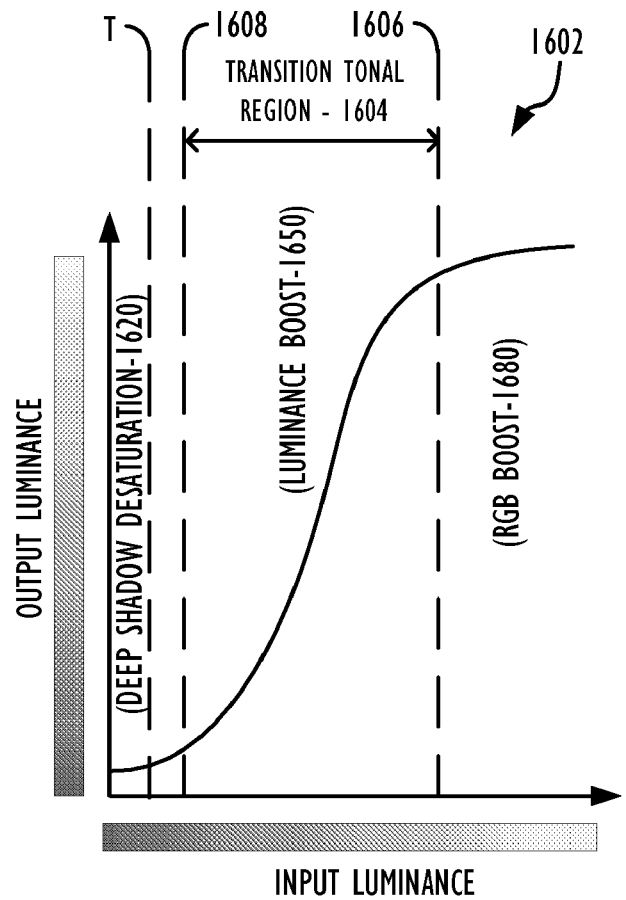
FIG. 16B illustrates details of the automated processes in FIG. 16A in a graph of input and output luminance.

In one embodiment, the automated deep shadow de-saturation process 1620 can be implemented in the first conversion stage 303 of FIG. 3 from camera RGB to the XYZ color space. This process 1620 focuses on the RGB color values in the camera RGB image with luminance values below a shadow de-saturation threshold. FIG. 16B graphically shows a shadow de-saturation threshold by line T in an input/output luminance graph 1602. The desaturation process 1620 reduces the saturation of those deep shadow RGB color values below the threshold T in proportion to their closeness to black. The shadow de-saturation threshold T may correspond to luminance levels within 1% of black.

In the de-saturation process 1620, the original luminance $L_O$ for each pixel of the RGB image is computed using standard techniques. The computed luminance $L_O$ is compared to the shadow de-saturation threshold T to determine if the computed luminance $L_O$ is below the threshold T. If it is below the threshold T, then an interpolated grayscale luminance $L_G$ is calculated using an interpolation function. Then, this interpolated grayscale luminance $L_G$ replaces each of the original color values of R, G, and B of the deep shadow pixel. In the interpolation, the grayscale luminance $L_G$ is preferably made proportional to the closeness of the pixel's original luminance $L_O$ to black so that the interpolated grayscale luminance $L_G$ transitions smoothly from the deep shadow de-saturation threshold T to black. Replacing deep shadow luminance with the interpolated grayscale values can reduce colorful noise in the deep shadows of the image.

2. RGB Separable Boost

The automated RGB separable boost 1680 can be performed in the pipeline 300 of FIG. 3 when the image is in the RGB color space. In general, an RGB-separable boost is preferred as a technique for increasing image contrast and adjusting the image's tonal curve by modifying the luminance of each R, G, and B channel individually. When increasing contrast using an RGB-separable boost in the shadow and lower midtone areas of an image, the saturation of the color can be increased as a side-effect of an RGB-separable boost. When an image has a considerable amount of noise, this increase in contrast will make the noise more colorful and less desirable. The more "monochromatic" the noise appears (in line with the local colors of the image), the more the noise resembles traditional analog film grain. If the colorfulness of the noise is increased by an RGB-separable boost, then the noise will exhibit red and blue color shifts from the local color of the image, which is not desirable. In the tonal regions where this undesirable artifact occurs, a luminance boost discussed below is used instead of the RGB-separable boost 1680. Accordingly, in the present embodiment, the RGB separable boost 1680 focuses mainly on higher tones (e.g., those tones above a mid-tone level indicated by line 1606 in the graph 1602 of FIG. 16B). When applied to these higher tones, the RGB separable boost 1680 tends to reduce the colorfulness in the highlight regions of the image.

3. Luminance Boost and Transition Tonal Region

The automated luminance boost 1650 can also be performed in the pipeline 300 of FIG. 3 when the image is in the RGB color space. Like the RGB boost 1680, the luminance boost 1650 can also be used to control contrast in the RGB image 1690. Unlike the RGB separable boost 1680, however, the luminance boost 1650 does not modify the luminance of each R, G, and B channel individually. Instead, the luminance boost 1650 is applied to all three channels at the same time. In addition, the luminance boost 1650 focuses on a transition tonal region that is below the mid-tone level used for the RGB separable boost 1680. As roughly indicated in the graph 1602 of FIG. 16B, the transition tonal region 1604 for the luminance boost 1650 is a region between a quartertone level 1608 and the mid-tone level 1606. When applied to this tonal region 1604, the luminance boost 1650 tends to reduce some of the shortcomings associated with separable boosting each channel R, G, B individually in this tonal region 1604.

Figure 16C:
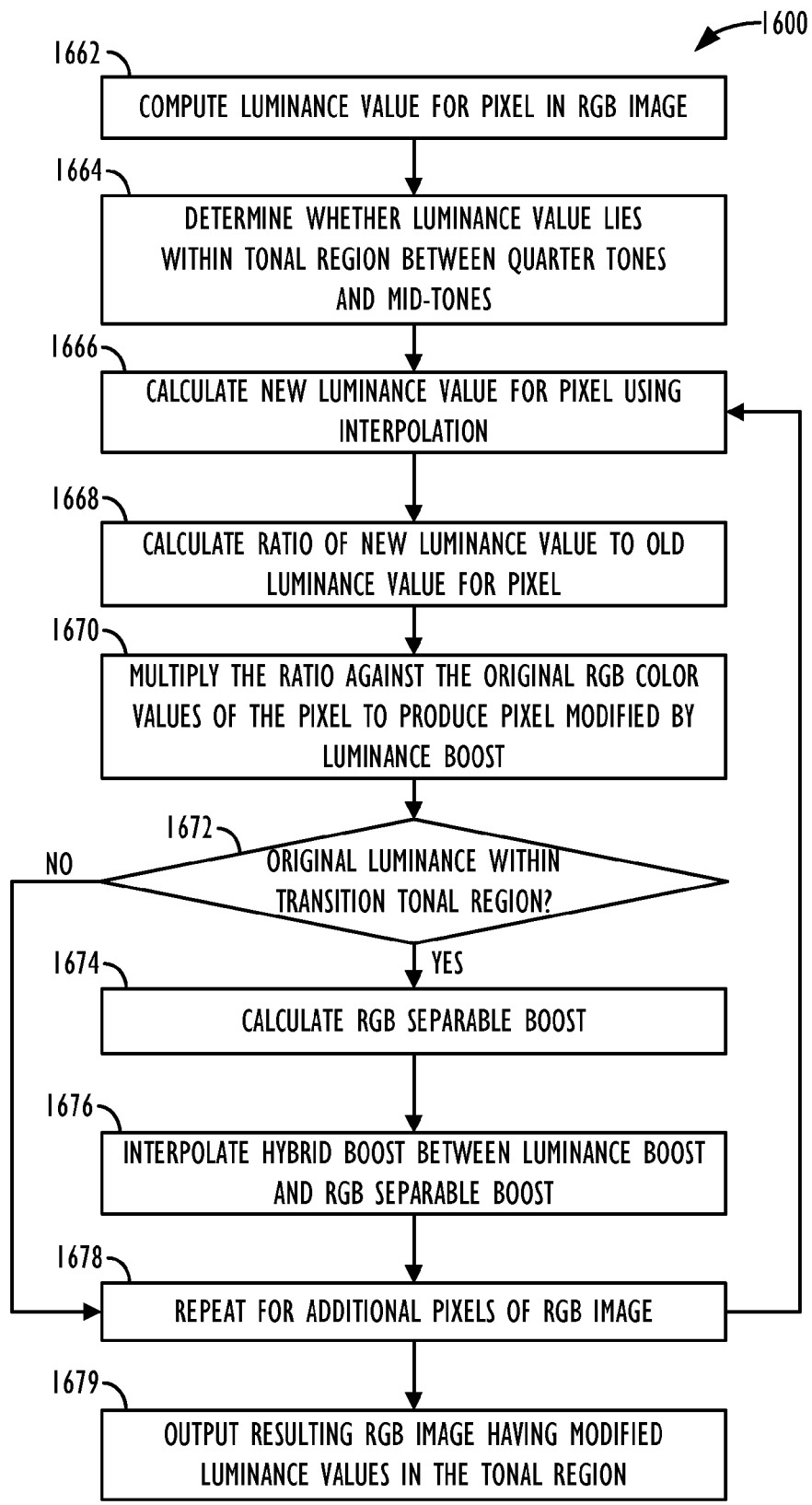
FIG. 16C illustrates one embodiment of a luminance boost for use in the automated RAW image processing pipeline of FIG. 3.

FIG. 16C illustrates one embodiment of an automated luminance boost 1660. First, luminance values of the pixels in the RGB image are calculated (Block 1662), and those luminance values below the maximum luminance value (e.g., level 1606 in FIG. 16C) are determined (Block 1664). As noted previously, the defined transition tonal region can be region 1604 of FIG. 16B having an upper luminance value 1606 and a lower luminance value 1608. For those pixels having original luminance values within the tonal region 1604, new luminance values are calculated using interpolation (Block 1666).

When processing is performed using a GPU of a processing device, an interpolation function, which may be embodied in a cubic equation, is used for the interpolation. When processing is performed using a CPU, on the other hand, the interpolation is preferably embodied in a look-up table having a plurality of entries computed by a cubic equation. Such a look up table may have approximately 65,000 entries. For example, a pixel having $R_1$, $G_1$, $B_1$ channel values in the original image is computed to have a luminance value $L_1$ using standard techniques.

In the interpolation of Block 1666, luminance values within the tonal region preferably transition smoothly with those luminance values outside the tonal region. To determine a new luminance value $L_2$, the computed luminance $L_1$ is used in a piecewise cubic function of luminance or in a look-up table (e.g., $L_2$=Table[$L_1$]) that embodies evaluations of the piecewise cubic function of luminance. In one embodiment, the piecewise cubic equation used by the GPU and used to construct the look-up table for the CPU can be characterized by:

if($x$<lu min ance_threshold_1)

$y=ax^3+bx^2+cx+d;$ else if (lu min ance_threshold_2)

$y=ex^3+fx^2+gX+h;$ else if (lu min ance_threshold_3)

$y=ix^3+jx^2+kx+l;$ else $y=m\times3+nx^2+ox+p;$

Any two abutting cubics are preferably designed to have matching values at the luminance threshold that separates them. In addition, the abutting cubics are designed to have matching slopes at the same luminance threshold that separates them. Typically, the luminance_threshold_1 is 0.1, the luminance_threshold_2 is 0.2, and the luminance_threshold_3 is 0.5. In addition, the value of y at x=0 is zero. This implies that the coefficient d is identically equal to 0. The value of y at x=1 is 1 as well. This has implications for the cubic defined by the coefficients m, n, o, and p.

After interpolating the new luminance values, a ratio of the new luminance $L_2$ to the old luminance $L_1$ is calculated (Block 1668), and the factor is multiplied to the original color values $R_1$, $G_1$, $B_1$ to obtain the new color values $R_2$, $G_2$, $B_2$ for the image to produce a pixel having color values modified by the luminance boost (Block 1670). For example, the modified pixel will have RGB color values characterized by $$R_2 = \left(\frac{L_2}{L_1}\right)R_1, \quad G_2 = \left(\frac{L_2}{L_1}\right)G_1, \quad \text{and} \quad B_2 = \left(\frac{L_2}{L_1}\right)B_1,$$

As shown in FIG. 16B, the transitional tonal region 1604 is defined by a minimum luminance value 1608 and a maximum luminance value 1606. Below the minimum luminance value 1608 of the transition tonal region 1604, the luminance boost 1650 discussed above is used directly to compute the boosted RGB values for this region. Within the transitional tonal region 1604, however, a hybrid boost is used depending on the amount of noise in the image. In the hybrid boost, both the luminance boost 1650 and the RGB-separable boost 1680 are evaluated.

Thus, at Block 1672 of FIG. 16C, a determination is made whether the luminance value for the selected pixel lies within the transitional tonal region. If not, then the boosted RGB values from the previously calculated luminance boost are used for the given pixel, and the process 1600 passes to Block 1678.

If the original luminance value for the selected pixel lies within the transitional tonal region at Block 1672, then the RGB-separable boost (1680) for the luminance value is calculated (Block 1674). Then, the boosted RGB values for those luminance values within the tonal region are computed by interpolating between the previously calculated luminance boost (1650) and the RGB-separable boost (1680) based on where the original luminance value lies within the transition tonal region (1604) (Block 1676). The interpolant is computed using a smooth function that varies from "0" at the minimum luminance value (1608) of the transition tonal region (1604) to "1" at the maximum luminance value (1606) of the transitional tonal region (1604). As discussed previously, the RGB-separable boost (1680) is used alone for values above the maximum luminance level (1606), and the luminance boost (1650) is used alone for values below the minimum luminance level (1608).

Preferably, the hybrid boost interpolated between the RGB-separable and luminance boosts is only employed when the image has a given amount of noise. When the image has little noise, for example, the RGB-separable boost (1680) is preferably used for the entire tonal range. If, however, the image has an amount of noise above a threshold, the hybrid boost discussed above is used. If the image has an intermediate amount of noise, then both the straight RGB-separable boost and the hybrid boost are both calculated, and an interpolation between the straight RGB-separable boost and the hybrid boost is performed to determine the resulting boost to be used. Once the selected pixel is boosted, the process 1600 at Block 1678 repeats Blocks 1666 through 1678 for additional pixels of the original image. Finally, a resulting image having modified luminance values is produced (Block 1674).

As noted previously, a processing device (e.g., computer, imaging device, camera, etc.) having an operating system can perform the automated RAW image processing methods, services, and techniques disclosed herein. In addition, a program storage device, readable by a programmable processing device, can have instructions stored on the program storage device for causing the programmable processing device to perform the automated RAW image processing methods and techniques disclosed herein.

The foregoing description of preferred and other embodiments is not intended to limit or restrict the scope or applicability of the inventive concepts conceived of by the Applicants. As one example, although the present disclosure focused on RGB Bayer pattern and the RGB color space, it will be appreciated that the teachings of the present disclosure can be applied to other implementations of colored filter arrays and color spaces. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An automated RAW image processing method implementable by a processing device, the method comprising:

storing a plurality of predetermined tone curves, each of the predetermined tone curves derived by values of each pixel in a first reference image of a scene being paired to values of corresponding pixels in a second reference image of the scene, the first reference image obtained using a first camera, each of the predetermined tone curves generated based on the pairings and being associated with camera information for the first camera;

interpolating a RAW image to produce an interpolated image;

determining based on metadata associated with the RAW image which one or more of the predetermined tone curves to apply;

applying the one or more predetermined tone curves to the interpolated image to produce a resulting image; and making the resulting image available to an application executing on the processing device.

2. The method of claim 1, wherein the processing device comprises a computer.

3. The method of claim 1, comprising initially receiving the RAW image and the associated metadata communicated from an imaging device.

4. The method of claim 3, wherein the imaging device comprises a digital camera.

5. The method of claim 1, wherein each of the plurality of predetermined tone curves is associated with a digital camera identifiable by the metadata associated with the RAW image.

6. The method of claim 1, wherein each of the one or more predetermined tone curves is derived by—
  transforming the first and second reference images into grayscale images,
  pairing grayscale values for the two reference images,
  generating the predetermined tone curve based on the pairing, and
  associating the predetermined tone curve with the camera information for the first camera.

7. The method of claim 1, wherein each of the one or more predetermined tone curves is derived by—
  filtering the first reference image into a plurality of first color channel images, each first color channel image having pixel values of one color channel,
  filtering the second reference image into a plurality of second color channel images, each second color channel image having pixel values of one color channel,
  pairing color channel values for corresponding pixels of each of the first and second color channel images of the same color channel,
  generating a plurality of color channel tone curves based on the pairings, and
  associating the color channel tone curves with the camera information for the first camera.

8. The method of claim 1, wherein the act of interpolating the RAW image comprises demosaicing the RAW image into an interpolated image having a color space.

9. The method of claim 1, wherein the act of determining based on metadata associated with the RAW image which one of the one or more predetermined tone curves to apply comprises comparing information of the metadata identifying a digital camera to the camera information associated with the predetermined tone curves.

10. The method of claim 1, wherein the act of applying the predetermined tone curve to the interpolated image comprises:
  determining tone values of each pixel of the interpolated image; and
  adjusting the determined tone values of each pixel to match corresponding tone values from the predetermined tone curve.

11. The method of claim 1, wherein the act of making the resulting image available to an application executing on the processing device comprises interfacing an operating system service performing automated RAW image processing to the application using an application programming interface.

12. A non-transitory program storage device, readable by a programmable processing device, comprising instructions stored thereon for causing the programmable processing device to perform an automated RAW image processing method comprising:
  storing a plurality of predetermined tone curves, each of the predetermined tone curves derived by values of each pixel in a first reference image of a scene being paired to values of corresponding pixels in a second reference image of the scene, the first reference image obtained using a first camera, each of the predetermined tone curves generated based on the pairings and being associated with camera information for the first camera;
  interpolating a RAW image to produce an interpolated image;
  determining based on metadata associated with the RAW image which one or more of the predetermined tone curves to apply;
  applying the one or more predetermined tone curves to the interpolated image to produce a resulting image; and
  making the resulting image available to an application executing on the processing device.

13. The program storage device of claim 12, wherein the processing device comprises a computer.

14. The program storage device of claim 12, comprising initially receiving the RAW image and the associated metadata communicated from an imaging device.

15. The program storage device of claim 14, wherein the imaging device comprises a digital camera.

16. The program storage device of claim 12, wherein each of the plurality of predetermined tone curves is associated with a digital camera identifiable by the metadata associated with the RAW image.

17. The program storage device of claim 12, wherein each of the one or more predetermined tone curves is derived by—
  transforming the first and second reference images into grayscale images,
  pairing grayscale values for the two reference images,
  generating the predetermined tone curve based on the pairing, and
  associating the predetermined tone curve with the camera information for the first camera.

18. The program storage device of claim 12, wherein each of the one or more predetermined tone curves is derived by—
  filtering the first reference image into a plurality of first color channel images, each first color channel image having pixel values of one color channel,
  filtering the second reference image into a plurality of second color channel images, each second color channel image having pixel values of one color channel,
  pairing color channel values for corresponding pixels of each of the first and second color channel images of the same color channel,
  generating a plurality of color channel tone curves based on the pairings, and
  associating the color channel tone curves with the camera information for the first camera.

19. The program storage device of claim 12, wherein the act of interpolating the RAW image comprises demosaicing the RAW image into an interpolated image having a color space.

20. The program storage device of claim 12, wherein the act of determining based on metadata associated with the RAW image which one of the one or more predetermined tone curves to apply comprises comparing information of the metadata identifying a digital camera to the camera information associated with the predetermined tone curves.

21. The program storage device of claim 12, wherein the act of applying the predetermined tone curve to the interpolated image comprises
  determining tone values of each pixel of the interpolated image; and adjusting the determined tone values of each pixel to match corresponding tone values from the predetermined tone curve.

22. The program storage device of claim 12, wherein the act of making the resulting image available to an application executing on the processing device comprises interfacing an operating system service performing automated RAW image processing to the application using an application programming interface.

23. An automated RAW image processing method implementable by a processing device, the method comprising:
   obtaining a first reference image of a scene using a first camera;
   obtaining a second reference image of the scene;
   pairing values of each pixel in the first reference image to values of corresponding pixels in the second reference image;
   generating one or more tone curves based on the pairing;
   associating the one or more tone curves with camera information for the first camera; and
   storing the one or more tone curves and the associated camera information on a processing device for use in processing a RAW image.

24. The method of claim 23, wherein the scene comprises a color chart having a plurality of color patches.

25. The method of claim 24, wherein the color chart comprises a gray ramp image.

26. The method of claim 23, wherein the act of obtaining the second reference image of the scene comprises using a second camera different from the first camera to obtain the second reference image of the scene.

27. The method of claim 23, wherein the act of obtaining the second reference image of the scene comprises using a different illuminant to obtain the second reference image of the scene than used to obtain the first reference image.

28. The method of claim 23, wherein the act of obtaining the second reference image of the scene comprises making at least one modification to the second reference image with an application that has not been made to the first reference image.

29. The method of claim 23, wherein the act of pairing values of each pixel in the first reference image to values of corresponding pixels in the second reference image comprises:
   transforming the first and second reference images into first and second grayscale images,
   pairing grayscale values for corresponding pixels in the first and second grayscale images,
   generating a tone curve based on the pairing, and
   associating the tone curve with the camera information for the first camera.

30. The method of claim 29, wherein the act of transforming comprises scaling each of the first and second reference images.

31. The method of claim 30, wherein the act of scaling comprises substantially reducing differences between the first and second reference images caused from demosaicing or noise.

32. The method of claim 29, wherein the act of transforming comprises:
   determining a gain factor that matches a maximum brightness of one of the grayscale images to the other grayscale image; and
   scaling grayscale values in the one grayscale image by the determined gain factor.

33. The method of claim 29, wherein the act of generating comprises using interpolation to produce a substantially continuous curve based on the paired grayscale values between the first and second grayscale images.

34. The method of claim 23, wherein the act of pairing values of each pixel in the first reference image to values of corresponding pixels in the second reference image comprises:
   filtering the first reference image into a plurality of first color channel images, each first color channel image having pixel values of one color channel,
   filtering the second reference image into a plurality of second color channel images, each second color channel image having pixel values of one color channel,
   pairing color channel values for corresponding pixels of each of the first and second color channel images of the same color channel,
   generating a plurality of color channel tone curves based on the pairings, and
   associating the color channel tone curves with the camera information for the first camera.

35. The method of claim 23, further comprising using the one or more tone curves to automatically pre-process a RAW image.

36. The method of claim 35, wherein using the one or more tone curves comprises:
   interpolating the RAW image into an interpolated image;
   determining camera information from metadata associated with the RAW image;
   obtaining the one or more tone curves associated with the determined camera information;
   applying the one or more tone curves to one or more color channels of the interpolated image to produce a resulting image; and
   making the resulting image available to an application operating on the processing device.

* * * * *

UNITED STATES PATENT AND TRADEMARK OFFICE
CERTIFICATE OF CORRECTION

| | |
|---|---|
| PATENT NO. | : 7,893,975 B2 |
| APPLICATION NO. | : 11/756918 |
| DATED | : February 22, 2011 |
| INVENTOR(S) | : Mark Zimmer et al. |

Page 1 of 1

It is certified that error appears in the above-identified patent and that said Letters Patent is hereby corrected as shown below:

In column 15, line 62, delete "Avgerage" and insert -- Average --, therefor.

In column 15, line 66, delete "Avgerage)." and insert -- Average). --, therefor.

In column 18, line 50, delete "calorimeter" and insert -- colorimeter --, therefor.

In column 21, line 18, delete "covert" and insert -- convert --, therefor.

In column 22, line 33, delete "then" and insert -- than --, therefor.

In column 22, line 42, delete "p[ ]" and insert -- p[1] --, therefor.

In column 22, line 66, delete "(yw" and insert -- (xw --, therefor.

In column 27, line 17, delete "gX" and insert -- gx --, therefor.

In column 27, line 24, delete "mx3" and insert -- $mx^3$ --, therefor.

In column 27, line 45, delete "$B_1$," and insert -- $B_1$. --, therefor.

In column 30, line 65, in claim 21, delete "comprises" and insert -- comprises: --, therefor.

Signed and Sealed this
Fifteenth Day of November, 2011

David J. Kappos
*Director of the United States Patent and Trademark Office*